(12) United States Patent
Ryoki et al.

(10) Patent No.: US 12,259,714 B2
(45) Date of Patent: Mar. 25, 2025

(54) CELL CONTROLLER

(71) Applicant: OKUMA Corporation, Aichi (JP)

(72) Inventors: Masato Ryoki, Aichi (JP); Koji Eba, Aichi (JP); Akihito Kataoka, Aichi (JP); Takatoshi Asai, Aichi (JP)

(73) Assignee: OKUMA CORPORATION, Niwa-gun (JP)

( * ) Notice: Subject to any disclaimer, the term of this patent is extended or adjusted under 35 U.S.C. 154(b) by 460 days.

(21) Appl. No.: 17/523,082

(22) Filed: Nov. 10, 2021

(65) Prior Publication Data
US 2022/0147027 A1    May 12, 2022

(30) Foreign Application Priority Data
Nov. 12, 2020    (JP) .................... 2020-188984

(51) Int. Cl.
G05B 19/418    (2006.01)
B25J 9/16    (2006.01)

(52) U.S. Cl.
CPC ...... G05B 19/41815 (2013.01); B25J 9/1653 (2013.01); B25J 9/1682 (2013.01); G05B 2219/31074 (2013.01); G05B 2219/31078 (2013.01); G05B 2219/32252 (2013.01); G05B 2219/32393 (2013.01); G05B 2219/34348 (2013.01)

(58) Field of Classification Search
None
See application file for complete search history.

(56) References Cited

U.S. PATENT DOCUMENTS

| | | |
|---|---|---|
| 2004/0133310 A1 | 7/2004 | Watanabe et al. |
| 2006/0276934 A1 | 12/2006 | Nihei et al. |
| 2008/0051929 A1* | 2/2008 | Hongkham ....... H01L 21/67276 |
| | | 700/214 |
| 2019/0375065 A1* | 12/2019 | Sato ..................... B23Q 11/00 |

FOREIGN PATENT DOCUMENTS

| | | |
|---|---|---|
| JP | H03233601 A | 10/1991 |
| JP | H06277990 A | 10/1994 |
| JP | 2004185228 A | 7/2004 |
| JP | 2006343828 A | 12/2006 |
| JP | 2014235586 A | 12/2014 |

OTHER PUBLICATIONS

JPO Notice of Reasons for Refusal for corresponding JP Application No. 2020-188984; Issued Mar. 19, 2024; 6 pages.

* cited by examiner

*Primary Examiner* — Sean Shechtman
(74) *Attorney, Agent, or Firm* — CANTOR COLBURN LLP

(57) ABSTRACT

Provided is a cell controller for controlling an operation of a machining cell including two or more machines and one or more robots as work resources, the cell controller being configured to control the operation of the machining cell based on a production program recorded with one or more processes to be executed at the time of producing only one article of a corresponding item in the machining cell among production programs prepared corresponding to one or more items produced in the machining cell.

9 Claims, 26 Drawing Sheets

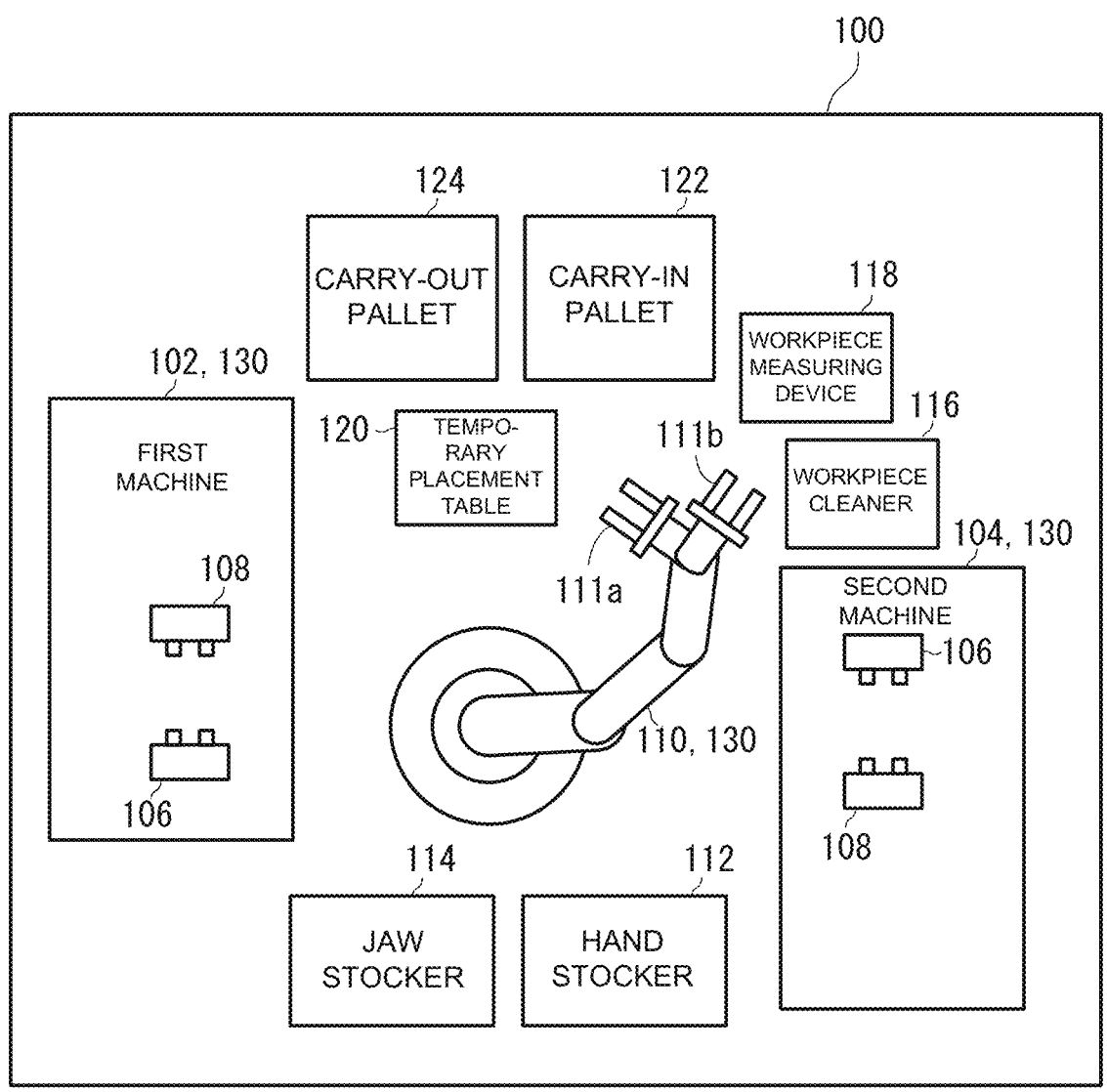
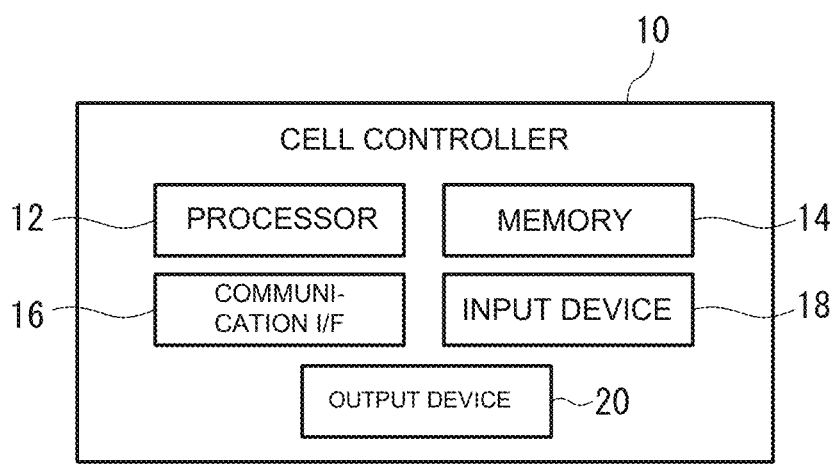
FIG. 1

| PROCESS | | RESOURCE | | RESOURCE PROGRAM | |
|---|---|---|---|---|---|
| PROCESS No. | PROCESS NAME | NC | ROBOT | NC | ROBOT |
| 0 | WAITING ON CARRY-IN PALLET | | | | |
| 1 | UNLOADING OF MATERIAL | | R1 | | RPR001-W01 |
| 2 | CONFIRMATION OF MATERIAL DIMENSIONS | | R1 | | RPR002-W01 |
| 3 | NC1 INSTALLATION PREPARATION | | R1 | | RPR003-W01 |
| 4 | NC1 INSTALLATION | NC1 | R1 | NPR004-W01 | RPR004-W01 |
| 5 | MAIN SP MACHINING OF NC1 | NC1 | | NPR005-W01 | |
| 6 | DELIVERY BETWEEN SPs OF NC1 | NC1 | | NPR006-W01 | |
| 7 | SUB-SP MACHINING OF NC1 | NC1 | | NPR007-W01 | |
| 8 | NC1 REMOVAL PREPARATION | NC1 | R1 | NPR008-W01 | RPR008-W01 |
| 9 | NC1 REMOVAL | NC1 | R1 | NPR009-W01 | RPR009-W01 |
| 10 | LOADING ON TEMPORARY PLACEMENT TABLE | | R1 | | RPR010-W01 |
| 11 | WAITING AT TEMPORARY PLACEMENT TABLE | | | | |
| 12 | ATTACHING TO WORKPIECE CLEANER | | R1 | | RPR012-W01 |
| 13 | WORKPIECE CLEANING | | | | |
| 14 | LOADING CARRY-OUT PALLET | | R1 | | RPR014-W01 |
| 15 | WAITING ON CARRY-OUT PALLET | | | | |

FIG. 4

| PROCESS No. | PROCESS NAME | RESOURCE NC | RESOURCE ROBOT | RESOURCE PROGRAM NC | RESOURCE PROGRAM ROBOT |
|---|---|---|---|---|---|
| 0 | WAITING ON CARRY-IN PALLET | | | | |
| 1 | UNLOADING OF MATERIAL | | R1 | | RPR001-W02 |
| 2 | CONFIRMATION OF MATERIAL DIMENSIONS | | R1 | | RPR002-W02 |
| 3 | NC2 INSTALLATION PREPARATION | | R1 | | RPR003-W02 |
| 4 | NC2 INSTALLATION | NC2 | R1 | NPR004-W02 | RPR004-W02 |
| 5 | MAIN SP MACHINING OF NC1 | NC2 | | NPR005-W02 | |
| 6 | DELIVERY BETWEEN SPs OF NC2 | NC2 | | NPR006-W02 | |
| 7 | SUB-SP MACHINING OF NC2 | NC2 | | NPR007-W02 | |
| 8 | NC2 REMOVAL PREPARATION | NC2 | R1 | NPR008-W02 | RPR008-W02 |
| 9 | NC2 REMOVAL | NC2 | R1 | NPR009-W02 | RPR009-W02 |
| 10 | LOADING ON TEMPORARY PLACEMENT TABLE | | R1 | | RPR010-W02 |
| 11 | WAITING AT TEMPORARY PLACEMENT TABLE | | | | |
| 12 | ATTACHING TO WORKPIECE CLEANER | | R1 | | RPR012-W02 |
| 13 | WORKPIECE CLEANING | | | | |
| 14 | LOADING CARRY-OUT PALLET | | R1 | | RPR014-W02 |
| 15 | WAITING ON CARRY-OUT PALLET | | | | |

FIG. 5

| PROCESS No. | PROCESS NAME | SINGLE | | DOUBLE | |
|---|---|---|---|---|---|
| | | MOUNTING PORTION | CNTs | MOUNTING PORTION | CNTs |
| 0 | WAITING ON CARRY-IN PALLET | | 8 | | 1 |
| 1 | UNLOADING OF MATERIAL | h1 | | h1 | |
| 2 | CONFIRMATION OF MATERIAL DIMENSIONS | h1 | | h1 | |
| 3 | NC1 INSTALLATION PREPARATION | h1 | | h1 | |
| 4 | NC1 INSTALLATION | h1 | | | |
| 5 | MAIN SP MACHINING OF NC1 | | | | |
| 6 | DELIVERY BETWEEN SPs OF NC1 | | | | |
| 7 | SUB-SP MACHINING OF NC1 | | 12 | h2 | 12 |
| 8 | NC1 REMOVAL PREPARATION | h1 | | h2 | |
| 9 | NC1 REMOVAL | h1 | | h2 | |
| 10 | LOADING ON TEMPORARY PLACEMENT TABLE | h1 | | | |
| 11 | WAITING AT TEMPORARY PLACEMENT TABLE | | 14 | | 14 |
| 12 | ATTACHING TO WORKPIECE CLEANER | h1 | | h2 | |
| 13 | WORKPIECE CLEANING | | 14 | | 14 |
| 14 | LOADING CARRY-OUT PALLET | h1 | | h2 | |
| 15 | WAITING ON CARRY-OUT PALLET | | | | |

FIG. 10

| SUCCEEDING WORKPIECE | | PRECEDING WORKPIECE | | RESOURCE | | COMPOSITE PROGRAM | |
|---|---|---|---|---|---|---|---|
| PROCESS No. | PROCESS NAME | PROCESS No. | PROCESS NAME | NC | ROBOT | NC | ROBOT |
| 3 | NC1 INSTALLATION PREPARATION | 8 | NC1 REMOVAL PREPARATION | | R1 | | RPR003C-W01234 |
| 4 | NC1 INSTALLATION | 9 | NC1 REMOVAL | NC1 | R1 | NPR004C-W01234 | RPR004C-W01234 |
| 10 | LOADING ON TEMPORARY PLACEMENT TABLE | 12 | ATTACHING TO WORKPIECE CLEANER | | R1 | | RPR010C-W01234 |
| 12 | ATTACHING TO WORKPIECE CLEANER | 14 | LOADING CARRY-OUT PALLET | | R1 | | RPR012C-W01234 |
| 3 | NC2 INSTALLATION PREPARATION | 8 | NC2 REMOVAL PREPARATION | | R1 | | RPR003C-W01235 |
| 4 | NC2 INSTALLATION | 9 | NC2 REMOVAL | NC2 | R1 | NPR004C-W01235 | RPR004C-W01235 |
| 10 | LOADING ON TEMPORARY PLACEMENT TABLE | 12 | ATTACHING TO WORKPIECE CLEANER | | R1 | | RPR010C-W01235 |
| 12 | ATTACHING TO WORKPIECE CLEANER | 14 | LOADING CARRY-OUT PALLET | | R1 | | RPR012C-W01235 |

FIG. 17

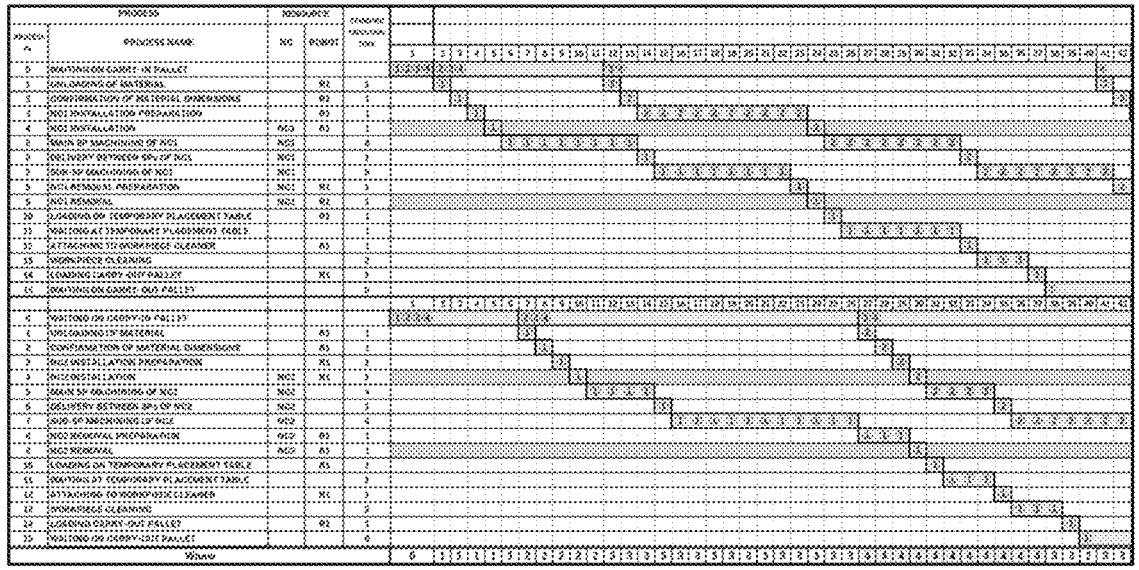
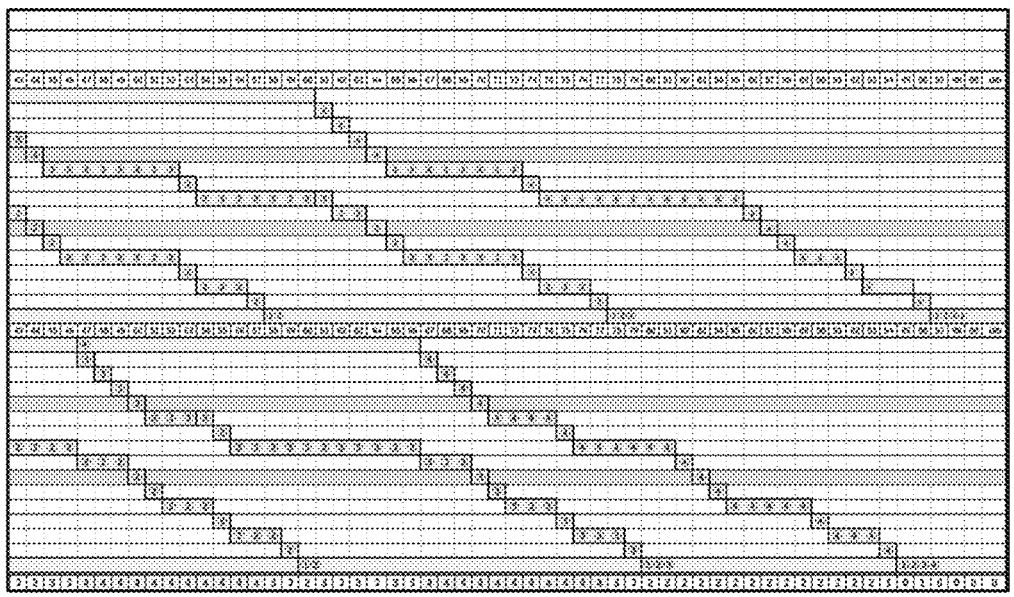
FIG. 20

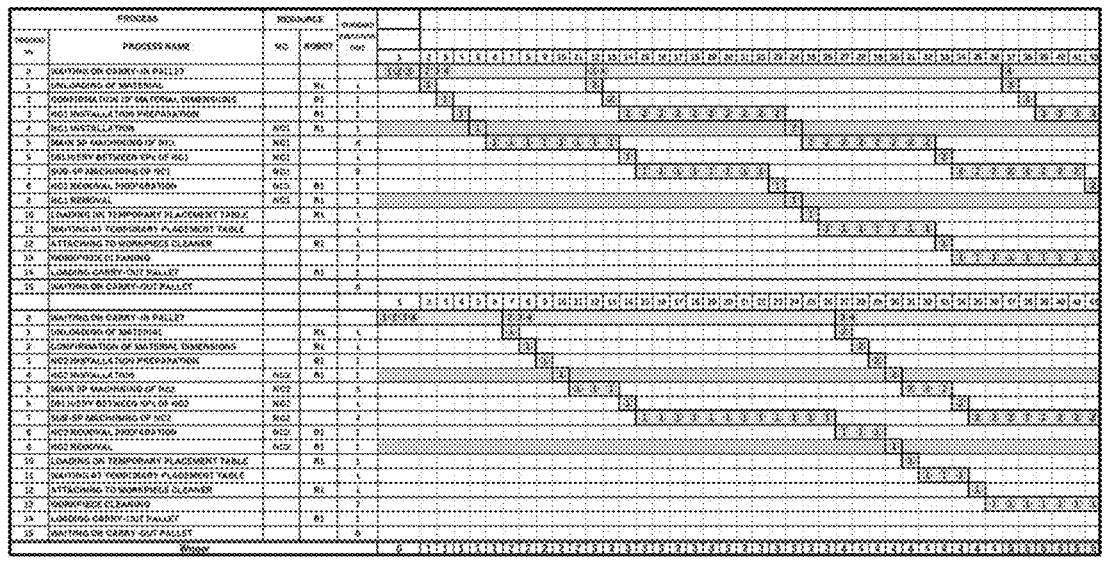
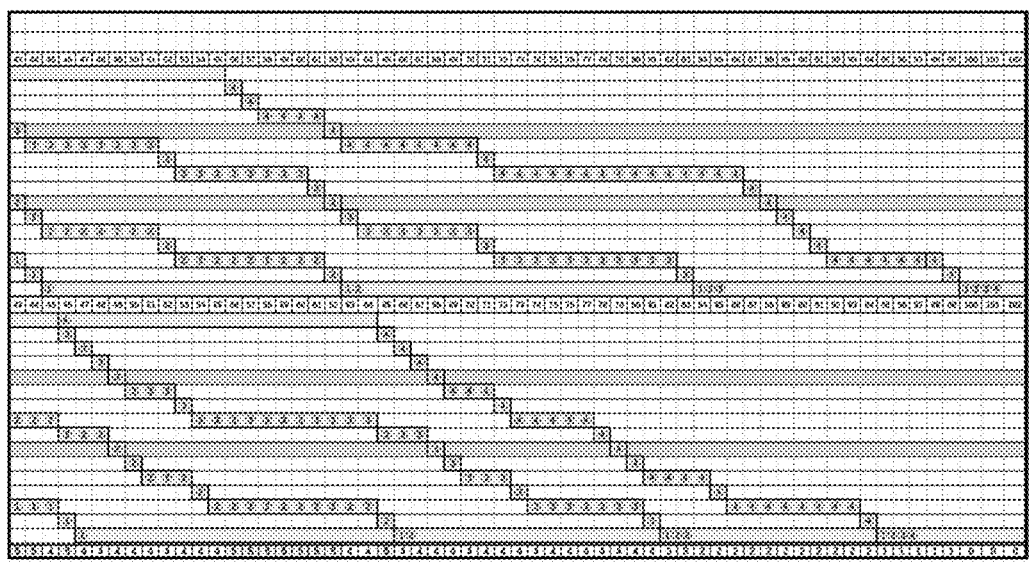
FIG. 21

FIG. 22

| PROCESS No. | PROCESS NAME | RESOURCE NC | RESOURCE ROBOT | RESOURCE PROGRAM NC | RESOURCE PROGRAM ROBOT | RETRY POINT |
|---|---|---|---|---|---|---|
| 0 | WAITING ON CARRY-IN PALLET | | | | | |
| 1 | UNLOADING OF MATERIAL | | R1 | | RPR001-W01234 | 1 |
| 2 | CONFIRMATION OF MATERIAL DIMENSIONS | | R1 | | RPR002-W01234 | 1 |
| 3 | NC1 INSTALLATION PREPARATION | | R1 | | RPR003-W01234 | |
| 4 | NC1 INSTALLATION | NC1 | R1 | NPR004-W01234 | RPR004-W01234 | 1 |
| 5 | MAIN SP MACHINING OF NC1 | NC1 | | NPR005-W01234 | | |
| 6 | DELIVERY BETWEEN SPs OF NC1 | NC1 | | NPR006-W01234 | | 1 |
| 7 | SUB-SP MACHINING OF NC1 | NC1 | | NPR007-W01234 | | |
| 8 | NC1 REMOVAL PREPARATION | NC1 | R1 | NPR008-W01234 | RPR008-W01234 | 1 |

FIG. 24

| PROCESS | | RESOURCE | | RESOURCE PROGRAM | | ALTERNATIVE PROCESS |
|---|---|---|---|---|---|---|
| PROCESS No. | PROCESS NAME | NC | ROBOT | NC | ROBOT | |
| 0004 | NC1 INSTALLATION | NC1 | R1 | NPR004-W01234 | RPR004-W01234 | 100400 |
| 0005 | MAIN SP MACHINING OF NC1 | NC1 | | NPR005-W01234 | | |
| 0006 | DELIVERY BETWEEN SPs OF NC1 | NC1 | | NPR006-W01234 | | 100600 |
| 0007 | SUB-SP MACHINING OF NC1 | NC1 | | NPR007-W01234 | | |
| 0008 | NC1 REMOVAL PREPARATION | NC1 | R1 | NPR008-W01234 | RPR008-W01234 | 100800 |
| 100800 | NC1 REMOVAL DIAGNOSIS OPERATION | NC1 | R1 | NRT100800 | RRT100800 | |
| 100810 | CASE 1  IN-MACHINE CLEANING, RETURNING | NC1 | R1 | NRT100810 | RRT100810 | |
| 100820 | CASE 2  SWARF REMOVAL, WORKPIECE EVACUATION | NC1 | R1 | NRT100820 | PRT100820 | |
| 100821 | HAND REPLACEMENT, SWARF REMOVAL | NC1 | R1 | NRT100821 | PRT100821 | |
| 100822 | RETURN OF HAND/WORKPIECE | NC1 | R1 | NRT100822 | PRT100822 | |

FIG. 25

CELL CONTROLLER

CROSS REFERENCE TO RELATED APPLICATION

The present invention claims priority under 35 U.S.C. § 119 to Japanese Patent Application No. 2020-188984 filed on Nov. 12, 2020, the entire content of which is incorporated herein by reference.

TECHNICAL FIELD

The present disclosure discloses a cell controller that controls an operation of a machining cell including two or more machines and one or more conveyance apparatuses such as robots.

BACKGROUND

In the related art, there has been known a machining cell including two or more machines and one or more robots, as work resources. A plurality of workpieces can be produced in parallel using such a machining cell. The machining cell is controlled by a cell controller. The cell controller outputs, to the plurality of work resources constituting the machining cell, a command according to an item of an article to be produced.

Here, the cell controller according to the related art often includes a commercially available general-purpose PLC. In this case, there has been developed a PLC program which meets requirement specifications of a machining cell of a factory line using a programming language of PLC to realize a desired production process. For example, the cell controller according to the related art instructs each work resource to execute a program for the work resource (for example, an NC program in a case of a machine) according to a progress of machining. In the cell controller according to the related art, it is necessary to create a PLC program such as a ladder program in which a behavior of the cell controller is described. An output timing of any program to any work resource is determined based on information such as a type of an item to be machined, a type of a work resource to be used, and a position of a workpiece in the middle of machining.

However, a function to be performed by the cell controller (eventually, the PLC) is described in the PLC program as an operation sequence from a combination of all input signals. Therefore, it is difficult for an equipment manager or an operator of the machining cell to create or modify the PLC program by himself/herself, and normally, the PLC program is created and modified by a system integrator who has expert knowledge.

Therefore, in the case of the cell controller using the PLC, there is a problem that operating costs are high because outsourcing to a system integrator is required. Further, there is a problem that it takes time to change the production process, because outsourcing to the system integrator is required every time the production process is changed. In particular, recently, demand for high-mix low-volume production has been high, and the production process has been frequently changed. There has been a big problem that outsourcing is required and it takes time for each change of the production process that occurs frequently in this way.

JP H06-277990 A discloses a cell controller that automatically generates a production schedule when an article is produced using a machining cell. However, a specific procedure for generating the production schedule is not specified in JP H06-277990 A. In particular, according to JP H06-277990 A, it is unclear how to eliminate contention for work resources between workpieces at the time of producing a plurality of workpieces in parallel.

In addition, JP 2004-185228 A discloses a system that allows each work resource to store in advance an operation program for executing one or more work units and, if necessary, allows a cell controller to output to each of the work resources a production command including a set of work units assigned with an execution sequence. In this case, when the production command is output from the cell controller, the work resource executes the operation program in the order instructed by the production command to perform work. However, according to the technique of JP 2004-185228 A, it is necessary to store a special program on the work resource, which is troublesome. Further, according to JP 2004-185228 A, it is also unclear how to eliminate contention for work resources between workpieces at the time of producing a plurality of workpieces in parallel.

Therefore, the present disclosure discloses a cell controller in which a production program, which avoids contention for work resources between a plurality of workpieces, can be easily created and edited even by an operator who is not familiar with detailed control specifications of a machining cell and a PLC language, and which is thereby capable of further improving production efficiency of an article.

SUMMARY

The present disclosure provides a cell controller for controlling an operation of a machining cell including two or more machines and one or more robots as work resources, the cell controller being configured to control the operation of the machining cell based on a production program recorded with one or more processes to be executed at the time of producing only one article of a corresponding item in the machining cell among production programs prepared corresponding to one or more items produced in the machining cell.

In this case, the cell controller may include: one or more production management units provided corresponding to the one or more items produced in the machining cell and configured to command loading of a new workpiece into the machining cell to produce an article of a corresponding item; a plurality of sequence execution units configured to sequentially execute the one or more processes recorded in the production program when receiving the command of the loading; and a plurality of resource arbitration units provided corresponding to the plurality of work resources, wherein the sequence execution unit may regard the resource arbitration unit as a work resource associated with the resource arbitration unit and transmit a command for the work resource to the resource arbitration unit, and the resource arbitration unit may arbitrate timing at which each of the plurality of sequence execution units uses the work resource associated with the resource arbitration unit.

Before execution of a current process is completed, the sequence execution unit may output a use request for a work resource newly required in a next process, to the resource arbitration unit associated with the work resource.

The robot may include one or more mounting portions on which hands are mounted, the sequence execution unit may specify a preceding workpiece passing determination process corresponding to a current process when a new robot is required in a next process, and issue a use request for the robot regarding the next process after another sequence execution unit for executing a production process of a preceding workpiece starts to execute the preceding workpiece passing determination process or issues a use request for a robot regarding the preceding workpiece passing determination process, and when the mounting portion used in the next process is a mounting portion used in a next resource calling process of using the robot again, the preceding workpiece passing determination process may be the next resource calling process, and may be the next process when the mounting portion used in the next process is different from the mounting portion used in the next resource calling process or when the next resource calling process does not exist.

The cell controller may further include a composite table storage unit configured to store a composite table recorded with two or more processes executable in parallel out of a plurality of processes that make up the production program and a composite command that allows the work resource to execute the two or more processes in parallel, wherein when receiving execution commands for the two or more processes executable in parallel from each of the two or more sequence execution units different from each other, the resource arbitration unit may convert the execution commands for the two or more processes into the composite command based on the composite table and output the composite command to the work resource.

The cell controller may include the two or more production management units operating independently of each other, and the cell controller may allow the machining cell to produce articles of the two or more items in parallel.

The cell controller may further include a retry determination unit configured to monitor presence or absence of an abnormality regarding the execution of the process, and, when the abnormality is detected, return to a beginning of the process in which the abnormality is detected or to a retry point set before the beginning of the process to issue to the sequence execution unit a retry command for re-executing one or more processes including the process.

In this case, when an alternative process is defined for the process designated to be re-executed by the retry command, the sequence execution unit may execute the alternative process.

The retry determination unit may determine that the abnormality occurs either when an elapsed time from a start of execution of the process exceeds a predefined allowable execution time or when an error is output from the work resource during the execution of the process.

The cell controller may include a workpiece skip execution unit configured to execute a workpiece skip process of disposing of a current workpiece when a number of continuous issue times of the retry command for the one process from the retry determination unit to the one sequence execution unit exceeds a predefined allowable number of times.

According to the cell controller of the present disclosure, an operator may create the production program recorded with one or more processes to be executed at the time of producing only one article of the corresponding item in the machining cell. Such a production program can be created only with the knowledge of the operator. As a result, there is no need to ask an outside expert to create the program. As a result, the time required to create and edit the production program can be reduced, so that production efficiency of the article can be further improved. In addition, when the cell controller includes the resource arbitration unit, it is possible to avoid contention for the work resources between the workpieces even when the operator does not create a complicated production program.

BRIEF DESCRIPTION OF DRAWINGS

Embodiment(s) of the present disclosure will be described based on the following figures, wherein:

FIG. 1 is a diagram showing a cell controller and a machining cell to be controlled by the cell controller;

FIG. 4 is a diagram showing an example of a production program for producing an article of a first item;

FIG. 5 is a diagram showing an example of a production program for producing an article of a second item;

FIG. 10 is a diagram illustrating a preceding workpiece passing determination process count;

FIG. 17 is a diagram showing an example of a composite table;

FIG. 20 is a diagram showing a simulation result of the cell controller;

FIG. 21 is a diagram showing another simulation result of the cell controller;

FIG. 22 is a diagram showing further another simulation result of the cell controller;

FIG. 24 is a diagram showing an example of a production program added with a retry point;

FIG. 25 is a diagram showing an example of a production program in which an alternative process is added.

EMBODIMENTS

Figure 2:
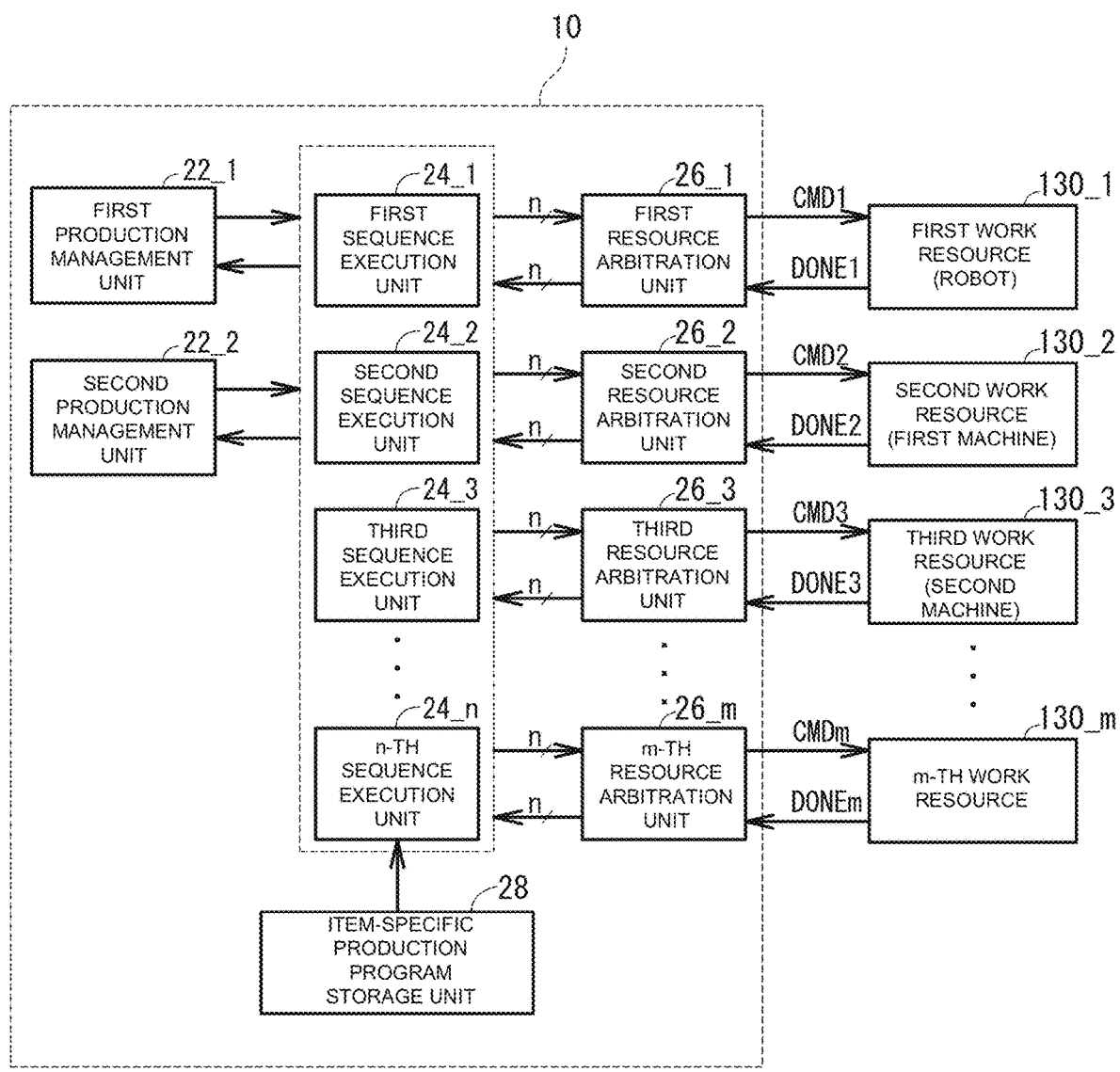
FIG. 2 is a functional block diagram of the cell controller.
Figure 3:
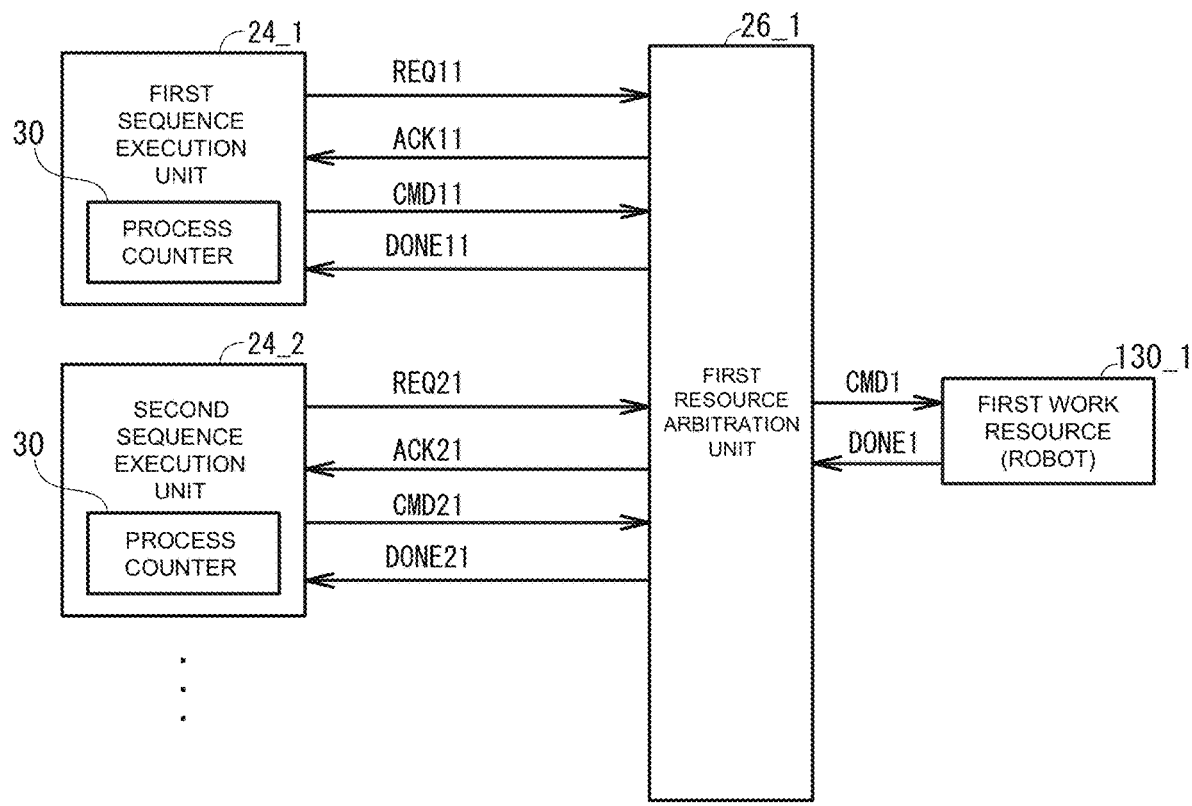
FIG. 3 is a diagram in which main components in FIG. 2 are extracted.

A configuration of a cell controller 10 will be described below with reference to the drawings. FIG. 1 is a diagram showing the cell controller 10 and a machining cell 100 to be controlled by the cell controller 10. Further, FIG. 2 is a functional block diagram of the cell controller 10, and FIG. 3 is a diagram in which main components in FIG. 2 are extracted.

First, the machining cell 100 to be controlled will be described. The machining cell 100 includes two or more machines 102 and 104 and performs various types of machining on a workpiece. The machining cell 100 of the present example includes two metalworking machines that perform machining on a metal material. The first machine 102 is a cutting machine that performs cutting on a metal workpiece; specifically, a lathe. The first machine 102 includes a main spindle 106 and a sub-spindle 108, and can automatically perform delivery of a workpiece from the main spindle 106 to the sub-spindle 108. Therefore, for example, a front surface and a rear surface of one workpiece can be continuously and automatically machined using the main spindle 106 and the sub-spindle 108, respectively. The second machine 104 has the same configuration as the first machine 102, and includes a main spindle 106 and a sub-spindle 108. A jaw is attached to a chuck of each of the machine 102 and 104 to hold the workpiece, but the jaw needs to be changed according to the shape of the workpiece. Therefore, the machining cell 100 is provided with a jaw stocker 114 configured to store a plurality of types of jaws.

Here, the first machine 102 and the second machine 104 may be used in parallel or serially. Accordingly, it may be the case that the workpiece machined by the first machine 102 is not loaded into the second machine 104, and it may be the case that the workpiece machined by the second machine 104 is not loaded into the first machine 102. For example, a workpiece for a first item may be machined by the first machine 102, and a workpiece for a second item may be machined by the second machine 104. Further, as another mode, the workpiece machined by the first machine 102 may be loaded into the second machine 104, and may be subjected to additional machining. For example, the workpiece for the first item may be subjected to rough machining by the first machine 102, and may be subjected to finish machining by the second machine 104.

The machining cell 100 is also provided with a robot 110. The robot 110 is provided to convey the workpiece or the jaw of the machine, for example. The robot 110 in the shown example is an articulated serial manipulator in which a plurality of links are coupled via joints. Hands 111a and 111b are interchangeably attached to a tip of the robot 110 to hold the workpiece. In the example of FIG. 1, the robot 110 is a double-hand type robot in which the two hands 111a and 111b can be mounted at the same time. In the following description, the two hands 111a and 111b are merely referred to as "hand 111" without the subscript when not being distinguished from each other. In the present example, the double-hand type robot 110 is used, but the robot 110 may be a single-hand type robot in which only one hand 111 can be mounted.

The type of hand 111 is selected according to the shape of the article to be held. For example, different types of hands may be used depending on whether the workpiece before machining is held or the workpiece after machining is held. In this case, in the single-hand type robot 110, the hand 111 to be mounted is replaced when the workpiece after machining is conveyed after the workpiece before machining is conveyed. In the double-hand type robot 110 as shown in FIG. 1, one robot 110 is mounted with the hand 111a for the workpiece before machining and the hand 111b for the workpiece after machining. In this case, the robot 110 can hold the workpiece before machining and the workpiece after machining at the same time, but cannot hold two workpieces before machining or two workpieces after machining at the same time. The hand 111 mounted to the robot 110 is kept in a hand stocker 112.

The machining cell 100 is further provided with a workpiece cleaner 116 and a workpiece measuring device 118. The workpiece cleaner 116 is a device for cleaning the workpiece after machining, and is, for example, a device for jetting a cleaning medium such as air or a cleaning liquid. Two workpieces can be loaded into the workpiece cleaner 116 at the same time. The workpiece measuring device 118 measures the shape of the workpiece before machining or after machining, and includes a laser measuring instrument, for example. The laser measuring instrument does not include a mechanism for placing or holding the workpiece, and the workpiece is measured by the workpiece measuring device 118 in a state of being held in the robot 110.

In the machining cell 100, a carry-in pallet 122, a carry-out pallet 124, and a temporary placement table 120 are further prepared as waiting places for workpieces. The carry-in pallet 122 is a waiting place for unmachined workpieces, and the carry-out pallet 124 is a waiting place for workpieces that have been produced and are scheduled to be carried out. The temporary placement table 120 is a place where workpieces temporarily wait in the middle of a production process. Two workpieces can be loaded into the temporary placement table 120 at the same time.

The cell controller 10 controls the operation of such a machining cell 100. More specifically, the cell controller 10 gives a command to the apparatus (for example, the machine or the robot 110, and the workpiece measuring device 118) constituting the machining cell 100 in order to produce only a required number of articles of a necessary item. In the following description, a "work resource 130" indicates the component, which receives a command from the cell controller 10, among the components of the machining cell 100. In the example of FIG. 1, it is assumed that, among the plurality of components, the first machine 102, the second machine 104, and the robot 110 each function as the work resource 130.

The cell controller 10 is a computer physically including a processor 12, a memory 14, a communication interface (hereinafter referred to as "communication I/F 16"), an input device 18, and an output device 20. The "computer" also includes a microcontroller in which computer systems are integrated into one an integrated circuit. In addition, the processor 12 includes a general-purpose processor (for example, a CPU: Central Processing Unit) or a dedicated processor (for example, a GPU: Graphics Processing Unit, an ASIC: Application Specific Integrated Circuit, an FPGA: Field Programmable Gate Array, or a programmable logic device) indicating a processor in a broad sense. An operation of the processor 12 to be described below may be performed not only by one processor 12, but also by cooperation of a plurality of processors 12 existing at positions physically distant from each other. Similarly, the memory 14 may physically include not only one memory, but also a plurality of memories 14 existing at positions physically distant from each other. Further, the memory 14 may include at least one of a semiconductor memory (for example, a RAM, a ROM, or a solid state drive) and a magnetic disk (for example, a hard disk drive).

The communication I/F 16 exchanges data with an external device (for example, a controller (not shown) of the robot 110 or the machine or another computer) of the cell controller 10. The communication I/F 16 may communicate with the external device in a wireless or wired manner. The input device 18 receives an operation instruction from an operator, and includes a keyboard, a mouse, a touch panel, and a microphone, for example. The output device 20 presents information to the operator, and includes a monitor, a speaker, and a printer, for example.

Such a cell controller 10 has a functional configuration as shown in FIG. 2. Prior to the description of a functional configuration of the cell controller 10, the cell controller 10 will be briefly described.

The cell controller 10 of the related art includes a commercially available general-purpose PLC in many cases. In this case, in order to realize a desired production process, a PLC program has been developed according to requirement specifications of the machining cell 100 of a factory line using a programming language of PLC. For example, the cell controller 10 of the related art instructs each work resource 130 to execute a program for the work resource 130 (for example, an NC program in the case of the machine) according to the progress of machining. In the cell controller 10 of the related art, it is necessary to create a PLC program such as a ladder program in which the behavior of the cell controller 10 is described. An output timing of any program to any of work resources 130 is determined based on information such as a type of the item to be machined, the type of the work resource 130 to be used, and the position of the workpiece in the middle of machining. However, such a PLC program describes the function to be performed by the cell controller 10 (and thus the PLC) as an operation sequence from a combination of all of input signals. Therefore, it is difficult for an equipment manager or an operator of the machining cell 100 to create or modify the PLC program by himself/herself, and normally, the PLC program is created and modified by a system integrator who has expert knowledge.

Therefore, in the case of the cell controller 10 using the PLC, there is a problem that operating costs are high, because outsourcing to a system integrator is required. Further, there is a problem that it takes time to change the production process, because outsourcing to the system integrator is required every time the production process is changed. In particular, recently, demand for high-mix low-volume production has been high, and the production process has been frequently changed. There has been a big problem that outsourcing is required and it takes time for each change of the production process that occurs frequently in this way.

The cell controller 10 of the present example does not require such a PLC program and controls the operation of the machining cell 100 based on a production program that can easily be created by the operator. The production program is a program that is recorded with one or more processes to be executed at the time of producing only one article in the machining cell 100. Such a production program is prepared for the number of items to be produced in the machining cell 100.

FIG. 4 is a diagram showing an example of a production program for producing the article of the first item, and FIG. 5 is a diagram showing an example of a production program for producing the article of the second item. In the production program for the first item shown in FIG. 4, a process number, a process name, the type of the work resource 130 to be used, and identification information on a resource program for operating the work resource 130 are recorded in association with each other for each of a plurality of processes (15 processes in the shown example) to be executed to produce the first item. Such a production program is stored in a file in a format in which parameters can be easily edited by the operator; for example, in a tabular format or a text format. In FIG. 4, among the work resources 130, the first machine 102 is written as "NC1", the second machine 104 is written as "NC2", and the robot 110 is written as "R1". Further, names of programs to be read and executed by the work resources 130 are recorded in columns of the resource program as identification information. According to the example of FIG. 4, the workpiece for the first item is cut by the first machine 102, and is conveyed by the robot 110.

The production program for the second item also has the same configuration, a process number, a process name, the type of the work resource 130 to be used, and identification information on a resource program for operating the work resource 130 are recorded in association with each other for each of a plurality of processes (15 processes in the shown example) to be executed to produce the second item. In the example of FIG. 5, the workpiece for the second item is cut by the second machine 104, and is conveyed to the robot 110. As is clear from FIG. 4 and FIG. 5, the production program of the present example is a program in which a production process of a single workpiece is recorded in order, and can be easily created and modified even by an operator who is unfamiliar with a programming language for PLC. Then, the control of the machining cell 100 is executed by the cell controller 10 based on the production program, whereby the operator can quickly respond to a change of the production process, and the article can be more efficiently produced.

The functional configuration of the cell controller 10 will be described below with reference to FIG. 2 and FIG. 3. Functionally, as shown in FIG. 2, the cell controller 10 includes one or more production management units 22_1 and 22_2, a plurality of sequence execution units 24_1 to 24_n, a plurality of resource arbitration units 26_1 to 26_m, and one item-specific production program storage unit 28. In the following description, the first production management unit 22_1 and the second production management unit 22_2 are merely referred to as "production management unit 22" without the notation of "first" or "second" and a subscript "_1" or "_2" when not being distinguished from each other. The same applies to the sequence execution unit and the resource arbitration unit.

The item-specific production program storage unit 28 stores the production program described above. The production program is prepared and stored corresponding to each of one or more items produced in the machining cell 100. The operator can store a new production program in the item-specific production program storage unit 28, as necessary. In addition, the operator can edit the production program stored in the item-specific production program storage unit 28, as necessary.

The production management unit 22 is provided corresponding to each of the items produced in the machining cell 100, and commands the machining cell 100 to load a new workpiece for the purpose of producing the corresponding item. In the present example, since the machining cell 100 produces the first item and the second item, the cell controller 10 includes two production management units 22; that is, the first production management unit 22_1 and the second production management unit 22_2. The production management unit 22 is actually an application that is started on the computer. Therefore, when the processor 12 executes an application program for the production management unit 22 stored in the memory 14, the computer functions as the production management unit 22. In the present example, since the two production management units 22; that is, the first production management unit 22_1 and the second production management unit 22_2, are provided, application programs for the two production management units 22 are started independently of each other.

The production management unit 22 receives a production command from an external computer or an operator. The production command includes identification information on an item to be produced and the number of lots to be produced. Upon receiving such a production command, the production management unit 22 commands the sequence execution unit 24, which will be described below, to execute the production program of the corresponding item. By such a command, a new workpiece is loaded on the machining cell 100. Therefore, the execution command of the production program to the sequence execution unit 24 by the production management unit 22 functions as an instruction to load a new workpiece to the machining cell 100. The execution command of the production program to the sequence execution unit 24 is repeated until the number of machined workpieces reaches the designated number of lots. Further, the production management unit 22 also manages the number of workpieces currently loaded into the machining cell 100 and the number of machined workpieces.

The sequence execution unit 24 sequentially executes one or more processes recorded in the production program designated from the production management unit 22, based on the command issued from the production management unit 22. As in the production management unit 22, the sequence execution unit 24 is also an application to be started on the computer. Therefore, when the processor 12 executes the application program for the sequence execution unit 24 stored in the memory 14, the computer functions as the sequence execution unit 24. In the present example, since a plurality of sequence execution units 24 are provided, applications for the plurality of sequence execution units 24 are started independently of each other.

The plurality of sequence execution units 24 operate independently of each other. Further, each of the sequence execution units 24 regards a resource arbitration unit 26, which will be described below, as the work resource 130 associated with the resource arbitration unit 26, and transmits to the resource arbitration unit 26 a command with respect to the work resource 130. Specifically, as shown in FIG. 3, the sequence execution unit 24 transmits to the resource arbitration unit 26 a use request REQnm of the work resource 130 and a command CMDnm to be issued to the work resource 130, and the resource arbitration unit 26 transmits to the sequence execution unit 24 a request permission notification ACKnm and a completion notification DONEnm indicating a command execution completion. In the "REQnm", "n" indicates the number of the sequence execution unit 24_n which is a request source, and "m" indicates the number of the resource arbitration unit 26_m which is a request destination. The meanings of "n" and "m" in "CMDnm", "ACKnm", and "DONEnm" are the same.

The first production management unit 22_1 sequentially uses a predetermined number (for example, four) of sequence execution units 24 in a ring buffer manner to execute production of a first item. For example, the first production management unit 22_1 instructs the first sequence execution unit 24_1 to load a first workpiece, instructs the second sequence execution unit 24_2 to load a second workpiece, instructs the third sequence execution unit 24_3 to load a third workpiece, and instructs the fourth sequence execution unit 24_4 to load a fourth workpiece. Then, when the production of the first workpiece is completed, the first production management unit 22_1 instructs the first sequence execution unit 24_1 to load a fifth workpiece. Similarly, the second production management unit 22_2 also sequentially uses a predetermined number (for example, four) of sequence execution units 24 in a ring buffer manner, and executes production of a second item while loading a workpiece machining command.

Here, the number of such sequence execution units 24 is not particularly limited as long as it is two or more. However, the sequence execution unit 24 is provided for a maximum number of workpieces that can be loaded into the machining cell 100 at the same time (hereinafter, referred to as a maximum loadable number Wmax) in order to reduce the time that the work resource 130 wastefully waits without performing the work and realize efficient production. When the first item and the second item are produced in parallel, the maximum loadable number Wmax is a total value of the maximum number of workpieces for the first item that can be loaded into the machining cell 100 at the same time (hereinafter, referred to as "first loadable number W1max") and the maximum number of workpieces for the second item that can be loaded into the machining cell 100 at the same time (hereinafter, referred to as "second loadable number W2max"). In other words, the following relation is satisfied: Wmax=W1max+W2max.

When the article of the first item and the article of the second item are produced in parallel according to the production programs shown in FIG. 4 and FIG. 5, the workpieces for the first item can be located at four places consisting of the robot 110, the first machine 102, the temporary placement table 120, and the workpiece cleaner 116 at the same time. Therefore, in this case, the first loadable number W1max is "4". The robot 110 can temporarily hold two workpieces, but in the present example, a state where two workpieces are assigned to one work resource 130 is not maintained across the process. Therefore, the number of workpieces located at the robot 110 can be counted as "1". Similarly, the number of workpieces located at the first machine 102 can be also counted as "1".

In this case, the workpieces for the second item can be located at four places consisting of the robot 110, the second machine 104, the temporary placement table 120, and the workpiece cleaner 116 at the same time. Therefore, the second loadable number W2max is also "4". Then, the maximum loadable number Wmax is 8 (Wmax=4+4). When being provided only for the maximum loadable number Wmax (=8), the sequence execution unit 24 can produce the workpieces having the maximum loadable number Wmax in parallel, thereby reducing the time that the work resource 130 wastefully waits and realizing efficient production. The sequence execution units 24 may be provided in an amount larger than the maximum loadable number Wmax (=8), but it should be noted that the amount of computer resources to be used increases while further improvement of the production efficiency cannot be expected.

The resource arbitration units 26 are provided corresponding to the plurality of work resources 130, respectively, and arbitrates a timing at which each of the plurality of sequence execution units 24 uses the corresponding work resource 130. In the case of the example of FIG. 1, since the three work resources 130 are provided in the first machine 102, the second machine 104, and the robot 110, three resource arbitration units 26 are provided. Then, for example, the first resource arbitration unit 26_1 is associated with the robot 110 (first work resource 1301), the second resource arbitration unit 26_2 is associated with the first machine 102 (second work resource 130_2), and the third resource arbitration unit 26_3 is associated with the second machine 104 (third work resource 130_3).

As in the production management unit 22 and the sequence execution unit 24, the resource arbitration unit 26 is also an application to be started on the computer. Therefore, when the processor 12 executes an application program for the resource arbitration unit 26 stored in the memory 14, the computer functions as the resource arbitration unit 26. In the present example, since the plurality of resource arbitration units 26 are provided, the applications for the plurality of resource arbitration units 26 are started independently of each other.

As described above, the resource arbitration unit 26 arbitrates a timing at which each of the plurality of sequence execution units 24 uses the corresponding work resource 130. For such arbitration, the resource arbitration unit 26 receives use requests REQnm from the plurality of sequence execution units 24 at any time. Then, when a corresponding work resource 130 is released, one use request REQnm is selected from the received use requests, based on an order of priority which is defined in the program in advance. Here, an algorithm for determining the order of priority can be appropriately changed according to the configuration of the device. In the present example, one use request REQnm is selected according to the following (1) to (3):

(1) Of the use requests REQnm of the same item, the request with the higher process number is prioritized.

(2) In a case of comparing the use requests REQnm of different items, the request having a long waiting time after issuance of the use request REQnm is prioritized.

(3) In a case where the use requests REQnm of different items have the same waiting time, the use request REQnm of the first item is prioritized.

When one use request REQnm can be selected, the resource arbitration unit 26 outputs a permission notification ACKnm to the sequence execution unit 24 that issues such a use request REQnm. Upon receiving the permission notification ACKnm, the sequence execution unit 24 outputs to the resource arbitration unit 26 a command CMDnm including identification information of the resource program registered in the production program. The resource arbitration unit 26 outputs the command CMDnm to the corresponding work resource 130. When the work resource 130 operates according to the transmitted command CMDnm, a machining process of the workpiece is executed. When the execution of the command CMDnm is completed, the work resource 130 outputs a completion notification DONEnm to the resource arbitration unit 26. The resource arbitration unit 26 transmits the received completion notification DONEnm to the sequence execution unit 24. Upon receiving the completion notification DONEnm, the sequence execution unit 24 notifies the resource arbitration unit 26 of a release of the work resource 130 or a command CMDnm of a subsequent process. Thereafter, all of the resource arbitration units 26 repeat the same process, whereby the workpiece is produced.

Figure 6:
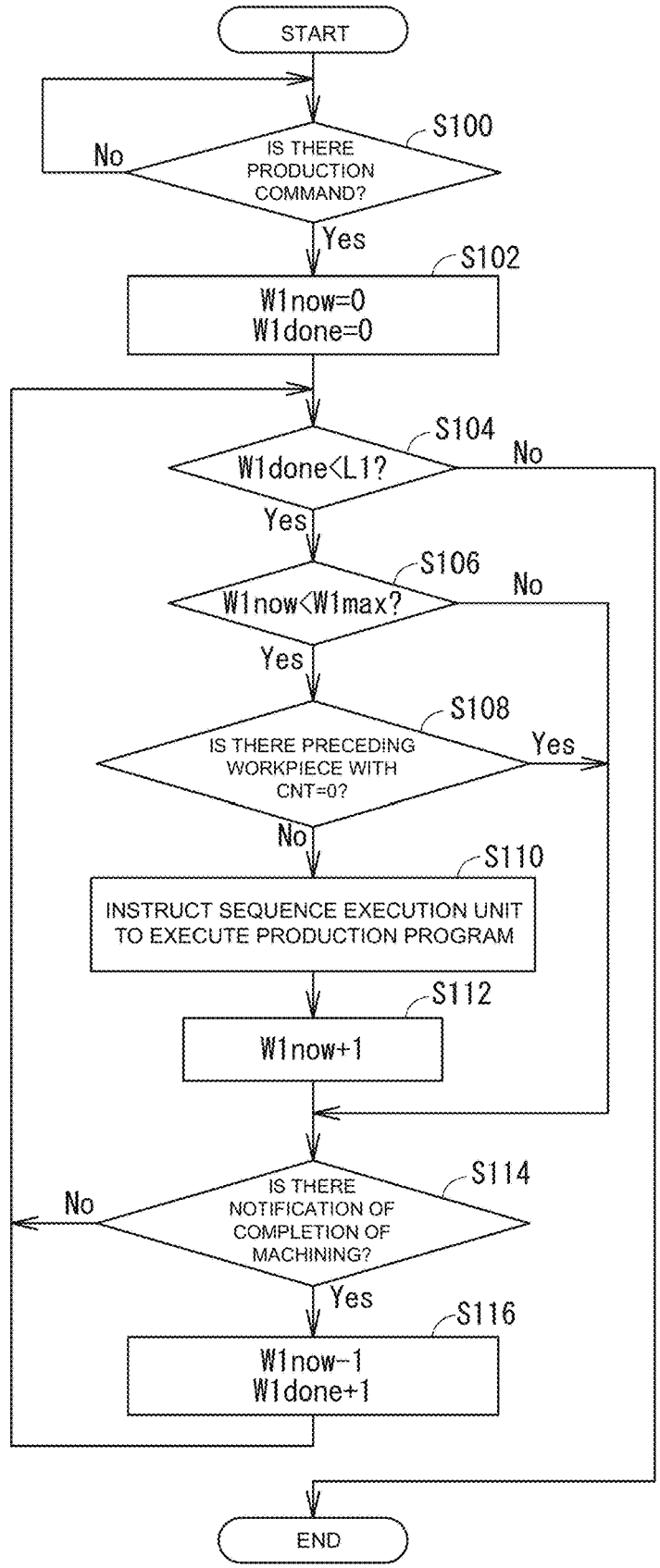
FIG. 6 is a flowchart showing a processing flow of a first production management unit.

A processing flow of each of the production management unit 22, the sequence execution unit 24, and the resource arbitration unit 26 will be described below. FIG. 6 is a flowchart showing a processing flow of the first production management unit 22_1. The first production management unit 221 waits until a production command is received from the operator or the external computer (S100). The production command includes identification information of the item to be produced and the number of lots L1 thereof. Upon receiving the production command, the first production management unit 22_1 resets a first loaded number W1now and a first completed number W1done to "0" (S102). The first loaded number W1now is the number of workpieces for the first item existing in the machining cell 100 at present. In addition, the first completed number W1done is the number of workpieces for the first item that have been already produced at present.

Next, the first production management unit 22_1 compares the first completed number W1done with the number of lots L1 (S104). When W1done<L1, the first production management unit 22_1 subsequently confirms whether a new workpiece for the first item can be loaded. Specifically, the first production management unit 22_1 compares the first loaded number W1now with the first loadable number W1max (S106) and confirms the presence or absence of a preceding workpiece with a process count CNT (=0) (S108). The process count CNT is a value of the number of the process currently being executed by each of the sequence execution units 24, and the value of the process count CNT is managed by the sequence execution unit 24.

When W1now≥W1max, it can be said that the machining cell 100 cannot afford to newly load the workpiece for the first item. Further, even if W1now<W1max, when there is a preceding workpiece with CNT=0; that is, a preceding workpiece whose production process has not proceeded from an initial state for some reason, the production progress cannot proceed for a new workpiece which is loaded. Therefore, when W1now≥W1max (No in S106), or when there is the preceding workpiece with CNT=0 (Yes in S108), the first production management unit 221 does not instruct the sequence execution unit 24 to execute the production program, and the process proceeds to step S114.

On the other hand, when W1now<W1max (Yes in S106) and there is no preceding workpiece with CNT=0 (No in S108), the first production management unit 22_1 instructs the sequence execution unit 24 not being busy to execute the production program (S110), and then increments the first loaded number W1now (S112). The execution instruction can be performed when the first production management unit 22_1 transfers the identification information (for example, name and address) of the production program to be executed to the sequence execution unit 24 as an argument.

In step S114, the first production management unit 22_1 monitors whether there is notification of completion of machining from the sequence execution unit 24. When there is the notification of the completion of machining from the sequence execution unit 24, the first loaded number W1now is decremented and the first completed number is incremented (S116). On the other hand, when there is no notification of the completion of machining, the process returns to step S104 without change of these parameters. Then, steps S104 to S116 are repeated until W1done≥L1 (No in S104). Here, the first production management unit 22_1 is described as an example, but the same applies to a processing flow of the second production management unit 22_2.

Figure 7:
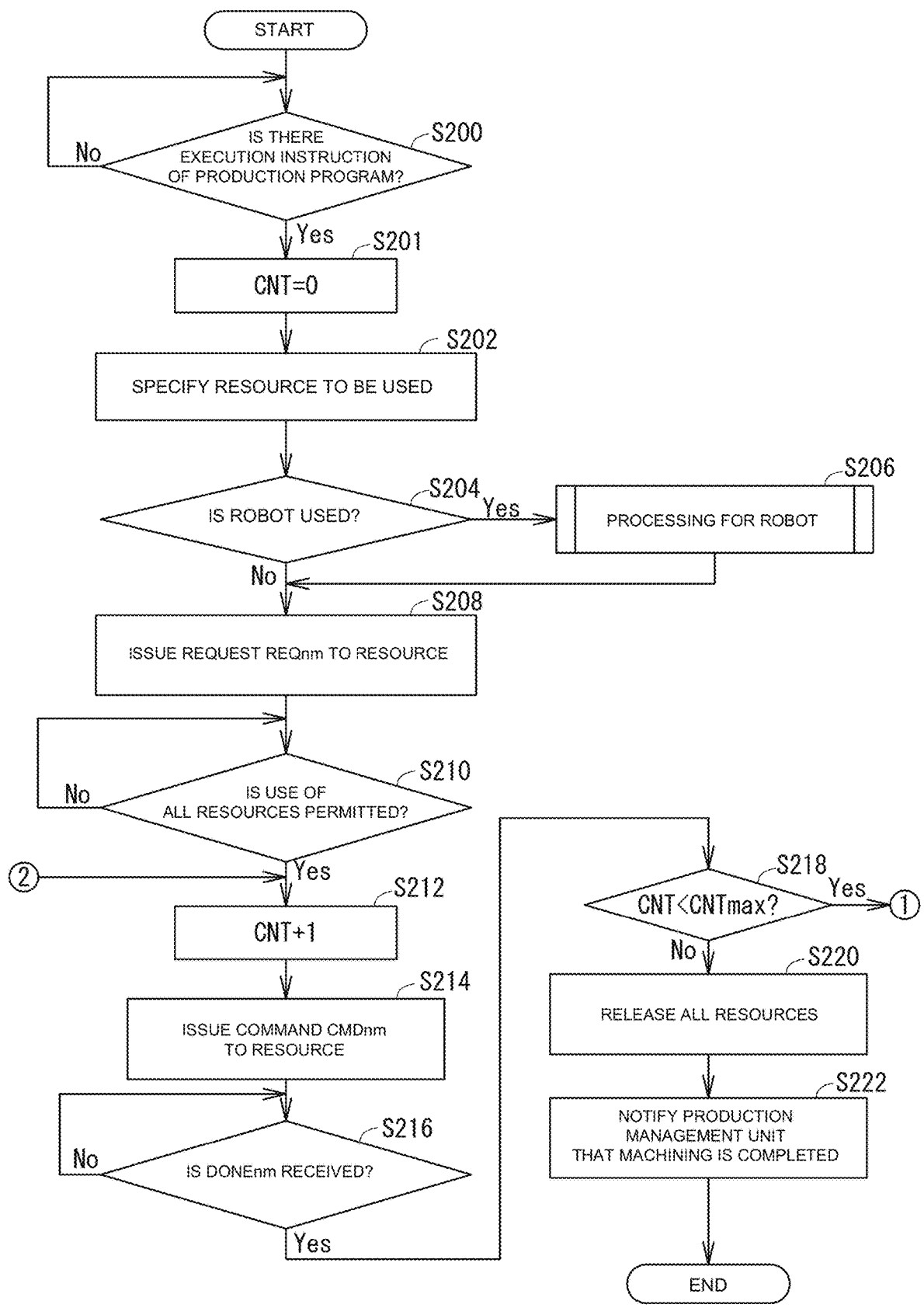
FIG. 7 is a flowchart showing a first half of a processing flow of a sequence execution unit.
Figure 8:
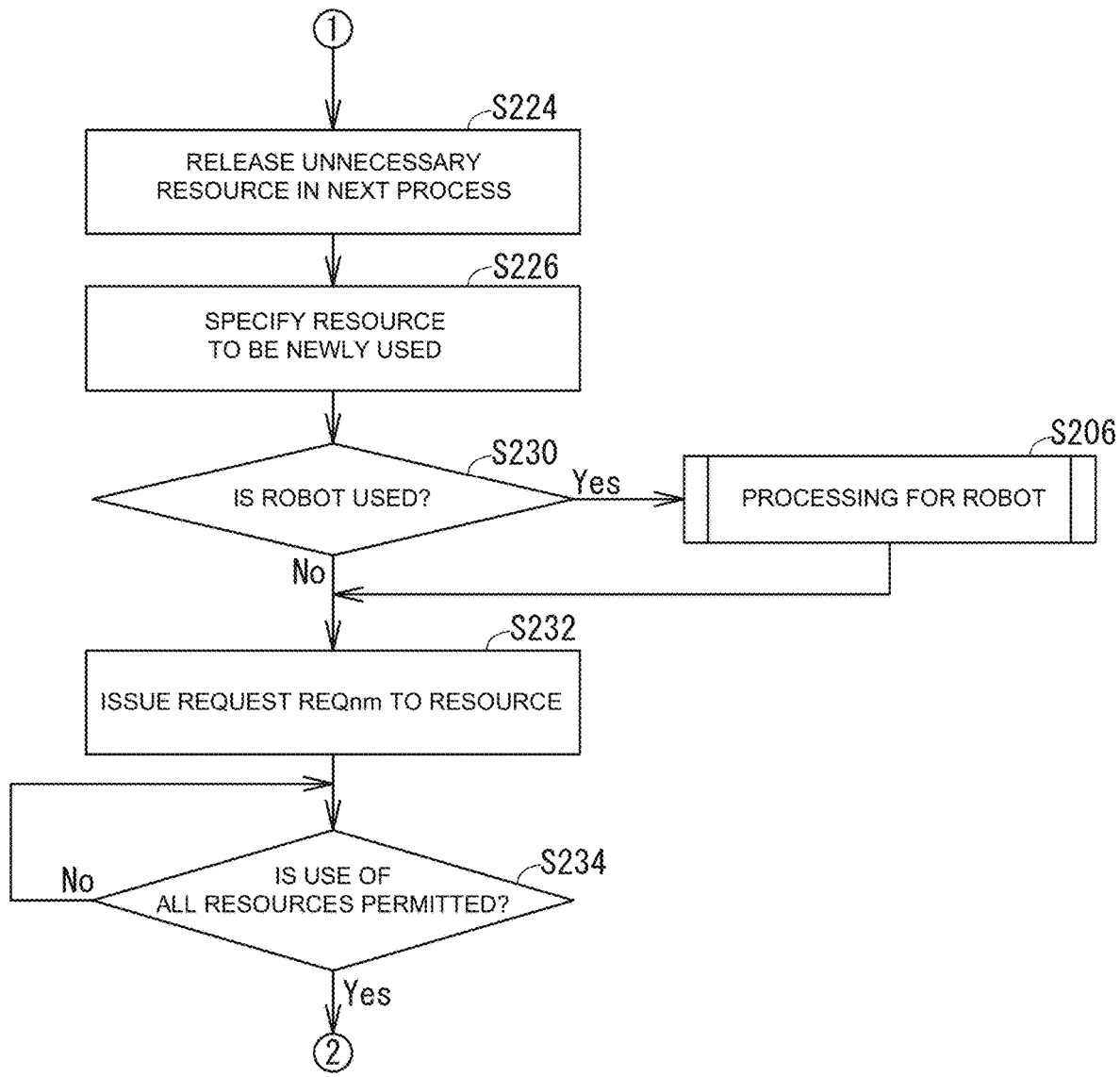
FIG. 8 is a flowchart showing a latter half of the processing flow of the sequence execution unit.

A processing flow of the sequence execution unit 24 will be described below with reference to FIG. 7 and FIG. 8. The sequence execution unit 24 waits until the execution of the production program is instructed by the production management unit 22 (S200). When the execution of the production program is instructed, the sequence execution unit 24 resets the process count CNT to "0" (S201). Subsequently, the sequence execution unit 24 reads out the production program designated from the production management unit 22, and specifies the work resource 130 used for execution of the initial process (S202). This can be specified by referring to resource columns of the production program (see FIG. 4 and FIG. 5). When the robot 110 is used as the work resource 130

(Yes in S204), the sequence execution unit 24 executes predetermined processing for robot (S206), which will be described below.

The sequence execution unit 24 subsequently issues a use request REQnm of the specified work resource 130 when being capable of specifying the work resource 130 to be used (S208). Such a use request REQnm is output to the resource arbitration unit 26 corresponding to the work resource 130. Therefore, when the robot 110 is used, the n-th sequence execution unit 24_$n$ outputs a use request REQn1 for the first resource arbitration unit 26_1 corresponding to the robot 110. In addition, when both the robot 110 and the first machine 102 are used, the n-th sequence execution unit 24_$n$ outputs both a use request REQn1 for the first resource arbitration unit 26_1 corresponding to the robot 110 and a use request REQn2 for the second resource arbitration unit 26_2 corresponding to the first machine 102. Each of the use requests REQnm includes the identification information of the item the value of the process count CNT managed by the sequence execution unit 24.

Thereafter, the sequence execution unit 24 waits until all of the work resources 130 requested to be used are permitted for use; that is, until the permission notification ACKnm is received (S210). When all of the work resources 130 are permitted for use, the sequence execution unit 24 increments the process count CNT (S212), and then outputs the command CMDnm, which is issued to the work resource 130 to be used, to the corresponding resource arbitration unit 26 (S214). Thereby, the command CMDnm is input to the work resource 130 via the resource arbitration unit 26, and processing according to the command CMDnm proceeds. The sequence execution unit 24 waits until the execution of the command CMDnm is completed; that is, until the completion notification DONEnm is received (S216).

When the execution of the command CMDnm is completed (Yes in S216), the sequence execution unit 24 compares the process count CNT with a maximum number of processes CNTmax (S218). When CNT CNTmax (No in S218), this means that the execution of the production program is completed. In this case, the sequence execution unit 24 releases all of the work resources; that is, sets the use request REQnm as an OFF (S220), and then notifies the production management unit 22 that the machining is completed (S222). Upon receiving the notification, the production management unit 22 decrements the loaded number Wnow and increments the completed number Wdone.

On the other hand, when CNT<CNTmax in step S218 (Yes in S218), this means that there is an unexecuted process. Therefore, in this case, the sequence execution unit 24 executes a next process. Specifically, the sequence execution unit 24 releases the unnecessary work resource 130 in the next process; that is, sets the use request REQnm as an OFF (S224), and then specifies a work resource 130 to be newly used in the next process (S226). Then, the sequence execution unit 24 performs predetermined processing for robot (S206) when the work resource 130 to be newly used includes the robot 110 (Yes in S230), and immediately issues the use request REQnm to the work resource 130 to be used (S232) when the robot 110 is not included (No in S230). Then, when all of the work resources 130 requested to be used are permitted for use (Yes in S234), the process proceeds to step S212. Then, the same process is repeated until CNT CNTmax.

Figure 9:
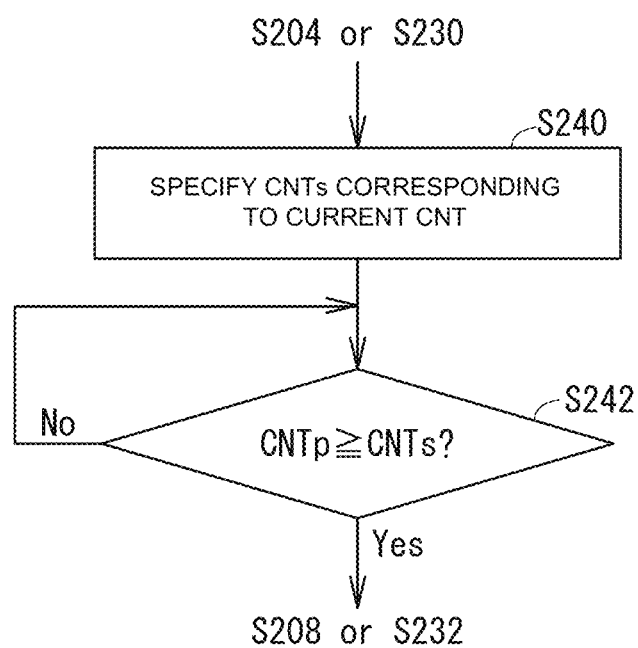
FIG. 9 is a flowchart showing a flow of processing for robot in FIG. 7 and FIG. 8.

Here, the processing for robot will be described with reference to FIG. 9 and FIG. 10. FIG. 9 is a flowchart showing a flow of the processing for robot. FIG. 10 is a diagram illustrating a preceding workpiece passing determination process count CNTs, which will be described below. Out of the work resources 130 provided in the machining cell 100, the robot 110 has a function of conveying the workpiece. In other words, the robot 110 functions as a loading device for loading the workpiece into the machine, and also functions as an unloading device for unloading the workpiece from the machine. Unless the use request REQnm for such a robot 110 is issued in consideration of the progress of other workpieces, a deadlock occurs in which a process progress of the preceding workpiece and a process progress of the succeeding workpiece interfere with each other.

For example, when the robot 110 is a single-hand type robot, it is assumed that permission to use the robot 110 is given to the succeeding workpiece before the preceding workpiece detached from the first machine 102. In this case, the preceding workpiece remains in the first machine 102, so that the succeeding workpiece cannot be attached to the first machine 102, and the robot 110 is occupied by the succeeding workpiece, so that the preceding workpiece cannot be detached from the first machine 102. As a result, a deadlock occurs in which both the process of attaching the succeeding workpiece to the first machine 102 and the process of detaching the preceding workpiece from the first machine 102 cannot proceed any further.

When the robot 110 is a double-hand type robot, two workpieces can be held at the same time, so that the problems described above are alleviated somewhat. However, as described above, in the case of the double-hand type, the robot 110 includes the hand for holding the unmachined workpiece and the hand for holding the workpiece after cutting. Therefore, the robot 110 can hold only one workpiece after cutting. As a result, when the preceding workpiece is taken out of the workpiece cleaner 116 using the post-cutting hand, a use request REQnm is issued to attach the succeeding workpiece to the workpiece cleaner 116 using the post-cutting hand. When the robot 110 is assigned to the succeeding workpiece, a deadlock occurs.

In the present example, therefore, when the use of the robot 110 is newly requested, the processing for robot is executed to perform adjustment with the preceding workpiece. In the processing for robot, first, a preceding workpiece passing determination process count CNTs corresponding to the current process count CNT is specified. The preceding workpiece passing determination process count CNTs is a process count in which the preceding workpiece should be completed when the succeeding workpiece issues the use request REQnm of the robot 110.

The preceding workpiece passing determination process count CNTs will be described in detail. During determination of the preceding workpiece passing determination process count CNTs, a next resource calling process and a mounting portion are important. The next resource calling process is a process of using the robot 110 again after stopping the use of the robot 110 first for all processes subsequent to the current process. In addition, the robot 110 is provided with mounting portions configured to mount the hands. The number of mounting portions is one in the single-hand type, and is two in the double-hand type. When the mounting portion used in the next process is the mounting portion used in the next resource calling process, a value of the next resource calling process is set as the preceding workpiece passing determination process count CNTs, and when the mounting portion used in the next process is different from the mounting portion used in the next resource calling process, or when the next resource calling process does not exist, a value of the next process is set as the preceding workpiece passing determination process count CNTs.

FIG. 10 is a diagram showing an example of a relation between the process count CNT and the preceding workpiece passing determination process count CNTs. In the example of FIG. 10, the succeeding workpiece (sequence execution unit 24) issues the use request REQn1 of the robot 110 at timing when the process count CNT (=0, 7, 11, or 13) is completed. The preceding workpiece passing determination process count CNTs is set for the process count CNT (=0, 7, 11, or 13).

In the case of the single-hand type, the mounting portion used in the next process count CNT (=1) after CNT=0 is "h1". Further, as viewed from the process count CNT (=0), the next resource calling process is a process count CNT (=8), and the mounting portion used in the process count CNT (=8) is "h1". Therefore, in the case of the single-hand type, the preceding workpiece passing determination process count CNTs corresponding to the process count CNT (=0) is "8". Similarly, the preceding workpiece passing determination process count CNTs corresponding to the process count CNT (=7) is "12". Regarding the process count CNT (=13), since the next resource calling process does not exist, the preceding workpiece passing determination process count CNTs becomes a count value of the next process; that is, "14".

On the other hand, in the case of the double-hand type, the mounting portion used in the next process count CNT (=1) after the process count CNT (=0) is "h1". As viewed from the process count CNT (=0), the next resource calling process is a process count CNT (=8), and the mounting portion used in the process count CNT (=8) is "h2". In other words, the mounting portion "h1" used in the next process differs from the mounting portion "h2" used in the next resource calling process. Therefore, in this case, the preceding workpiece passing determination process count CNTs corresponding to the process count (=0) is "1". In the case of the process count CNT (=7), the mounting portion "h2" used in the next process count CNT (=8) is equal to a mounting portion "h2" used in the next resource calling process count CNT (=12). Therefore, the preceding workpiece passing determination process count CNTs corresponding to the process count CNT (=7) is "12". The relation between the process count CNT and the preceding workpiece passing determination process count CNTs may be automatically determined by interpretation of the production program with the sequence execution unit 24 or by a correspondence table shown in FIG. 10 prepared in advance by the operator.

In the processing for robot, first, the preceding workpiece passing determination process count CNTs corresponding to the current process count CNT is specified (S240). Next, the sequence execution unit 24 compares the current process count (hereinafter, referred to as "preceding process count CNTp") of the preceding workpiece with the specified preceding workpiece passing determination process count CNTs (S242). As a result of comparison, when CNTp<CNTs (No in S242), the sequence execution unit 24 does not issue the use request REQnm to the robot 110, and waits as it is. On the other hand, when CNTp CNTs (Yes in S242), the process proceeds to step S208 or S232, and the sequence execution unit 24 issues the use request REQnm to the robot 110.

As described above, as for the work resource 130 that causes the deadlock, it is possible to reliably prevent the deadlock by issuing the use request REQnm in consideration of the progress of the preceding workpiece. In the present example, the progress of the preceding workpiece is considered only for the robot 110, but the progress of the preceding workpiece may also be considered for other work resources 130 as long as such work resources 130 causes the deadlock. In the present example, the sequence execution unit 24 grasps the progress of the preceding workpiece, and adjusts the issue timing of the use request REQnm. However, instead of the sequence execution unit 24, the resource arbitration unit 26 may grasp the progress of the preceding workpiece, and adjust the issue timing of the permission notification ACKnm. In the example of FIG. 10, the hand once mounted to the robot 110 is not replaced until the end of the production program. However, if necessary, types of the hands mounted to one mounting portion may be replaced.

Figure 11:
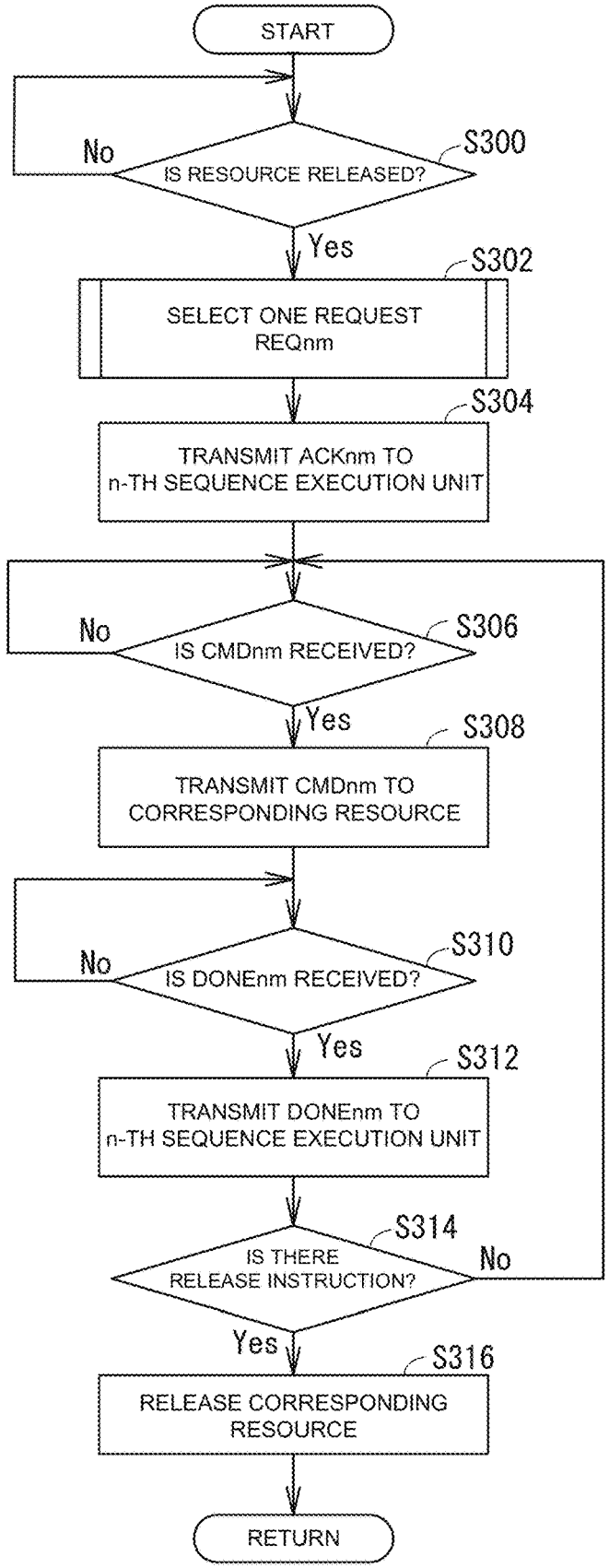
FIG. 11 is a flowchart showing a processing flow of the resource arbitration unit.
Figure 12:
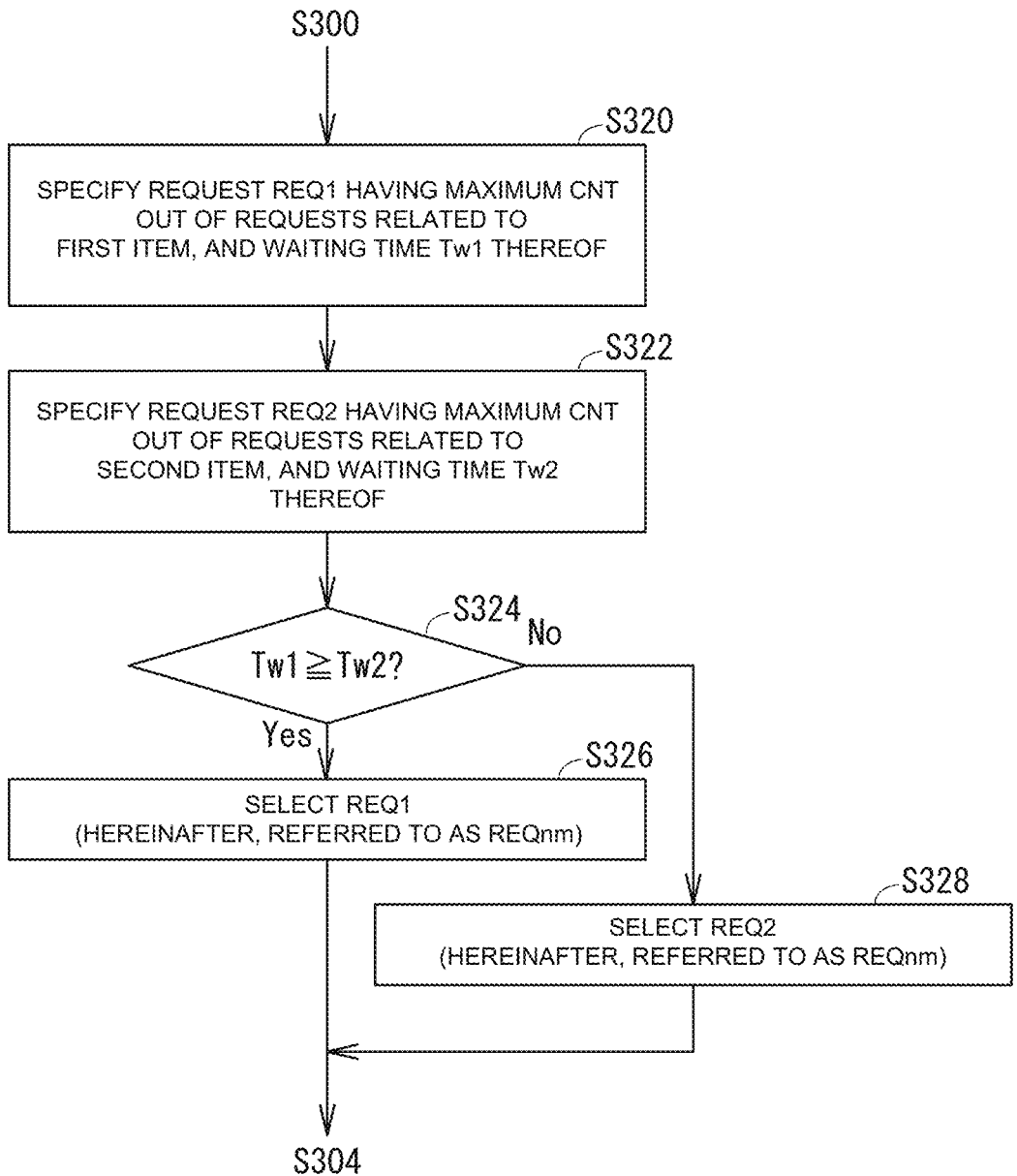
FIG. 12 is a flowchart showing a flow of selection processing in FIG. 11.

Next, processing of the resource arbitration unit 26 will be described. FIG. 11 is a flowchart showing a processing flow of the resource arbitration unit 26. In parallel with the processing of FIG. 11, the resource arbitration unit 26 receives the use request REQnm of the corresponding work resource 130 from the plurality of sequence execution units 24 at any time. In that state, when the corresponding work resource 130 is released (Yes in S300), the resource arbitration unit 26 selects one use request REQnm from the plurality of use requests received at that time (S302). FIG. 12 is a flowchart showing a flow of selection processing.

As shown in FIG. 12, when selecting a request, first, the resource arbitration unit 26 specifies a first use request REQ1 having the maximum process count CNT out of the use requests related to the first item and a waiting time Tw1 of the first use request REQ1 (S320). Subsequently, the resource arbitration unit 26 specifies a second use request REQ2 having the maximum process count CNT out of the use requests related to the second item and a waiting time Tw2 of the second use request REQ2 (S322). Subsequently, the resource arbitration unit 26 compares the waiting time Tw1 of the first use request REQ1 with the waiting time Tw2 of the second use request REQ2 (S324).

As a result of comparison, when the waiting time Tw1 is equal to or longer than the waiting time Tw2, (Yes in S324), the resource arbitration unit 26 selects the first use request REQ1 (S326). On the other hand, when the waiting time Tw1 is shorter than the waiting time Tw2 (No in S324), the resource arbitration unit 26 selects the second use request REQ2 (S328). The use requests selected in steps S326 and S328 will be referred to as "use request REQnm" in the following description.

If one use request REQnm can be selected according to the flow of FIG. 12, the resource arbitration unit 26 subsequently transmits a permission notification ACKnm to the n-th sequence execution unit 24_n that has issued the selected use request REQnm (S304). Thereby, an m-th work resource 130_m corresponding to an m-th resource arbitration unit 26_m is secured by the n-th sequence execution unit 24_n.

After issuing the permission notification ACKnm, the resource arbitration unit 26 waits until receiving the command CMDnm from the sequence execution unit 24 (S306). Upon receiving the command CMDnm, the resource arbitration unit 26 transmits the command CMDnm to the corresponding work resource 130 (S308). Thereby, the work resource 130 operates according to the resource program indicated by the command CMDnm. The work resource 130 transmits a completion notification DONEnm to the resource arbitration unit 26 when completing the operation instructed by the resource program. Upon receiving the completion notification DONEnm (Yes in S310), the resource arbitration unit 26 transmits the completion notification DONEnm to the sequence execution unit 24 (S312). Thereafter, when receiving a release instruction from the sequence execution unit 24 (Yes in S314), the resource arbitration unit 26 releases the corresponding work resource 130 (S316), and the process returns to step S300. On the other hand, when there is no release instruction (No in S314), the process returns to step S306, and the resource arbitration unit 26 waits until receiving a next command CMDnm.

As is clear from the above description, according to the present example, the resource arbitration unit 26 arbitrates contention between the use requests REQnm issued from the plurality of sequence execution units 24. Therefore, the operator may create a program for a single workpiece production; that is, only a production program without being aware of the contention between the workpieces. Thereby, a highly specialized system integrator is not required in the production of the article, so that costs can be reduced. Further, since the time required to create and modify the program for controlling of the machining cell 100 can be shortened, production efficiency can be further improved.

Next, another specific example will be described. In the specific example, the sequence execution unit 24 issues a use request REQnm for the work resource 130 required to execute the next process before the process currently being executed is completed (that is, before receiving the completion notification DONEnm). Thereby, a wasteful waiting time of the work resource 130 can be shortened, and production efficiency can be further improved.

In other words, in the above description, the sequence execution unit 24 has not issued the use request REQnm necessary for the nest process until the process currently being executed is completed. On the other hand, upon receiving the command CMDnm, the work resource 130 performs a predetermined preparation work first of all, and starts the work on the workpiece after the preparation work is completed. For example, in the case of the robot 110, when the command CMDnm is received, first, preparation work such as hand replacement is performed, and then the conveyance of the workpiece is started. Therefore, when the next use request REQnm is issued after the currently executing process is completed, there is a possibility that the workpiece may wait wastefully until the next process is started after the current process is completed. For example, a case is considered in which the workpiece is conveyed to the workpiece cleaner 116 after being cut by the first machine 102. In this case, when the use request REQnm is issued to the robot 110 after the cutting is completed, since the robot 110 starts the preparation work such as hand replacement after the cutting is completed, the workpiece is wastefully waiting in the first machine 102 for such a period, which leads to a long production time.

Therefore, in the present example, the sequence execution unit 24 issues the use request REQnm for the work resource 130 necessary for the execution of the next process before the currently executing process is completed. Here, the timing of issuing the use request REQnm of the next process (hereinafter, referred to as "pre-issue timing") is not particularly limited as long as it is before the current process is completed. However, when the pre-issue timing is too late, the wasteful waiting time of the workpiece increases. On the other hand, when the pre-issue timing is too early, the time for one sequence execution unit 24 to occupy the work resource 130 becomes wastefully long, which causes an increase in the waiting time of the other sequence execution units 24. Therefore, the pre-issue timing may be determined based on a preparation time of the next process. For example, the waiting time is obtained by subtracting the preparation time of the next process from the execution time of the current process, and a timing when an elapsed time after issuing the command CMDnm for the current process reaches the waiting time may be treated as the pre-issue timing. The execution time and the preparation time of each process can be obtained in advance from past actual results or simulations. In addition, the execution time and the preparation time of each process may be recorded in an itinerary program, or may be recorded in a separate file independently of the production program. In any case, the sequence execution unit 24 specifies the pre-issue timing of each process based on the execution time and the preparation time of each process stored in the memory 14.

Figure 13:
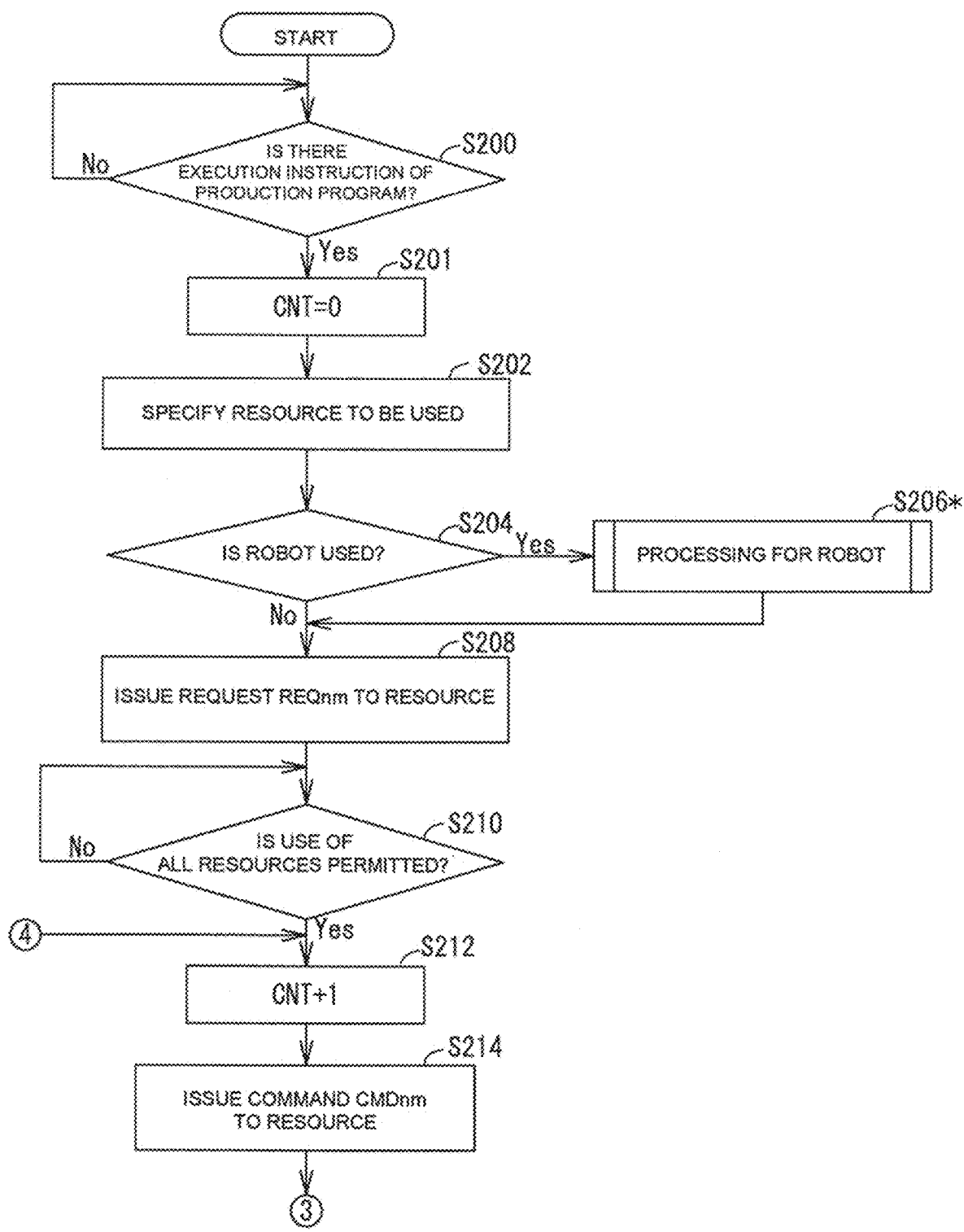
FIG. 13 is a flowchart showing a first half of a processing flow of a sequence execution unit in another specific example.
Figure 14:
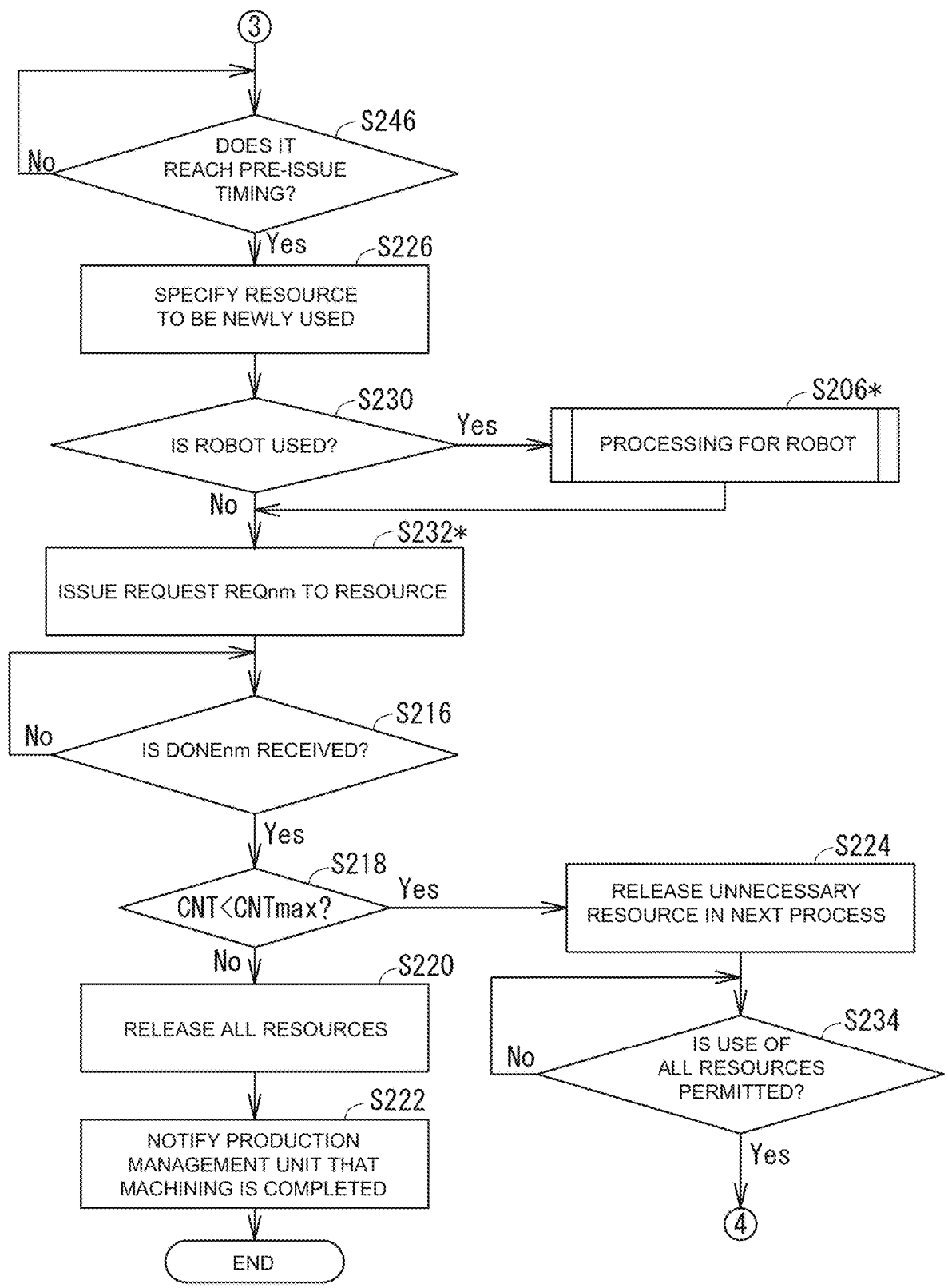
FIG. 14 is a flowchart showing a latter half of the processing flow of the sequence execution unit in another specific example.

FIG. 13 and FIG. 14 are flowcharts showing a processing flow of the sequence execution unit 24 in the present specific example. In FIG. 13, processes of steps S200 to S214 are almost the same as those of steps S200 to S214 in FIG. 7. In other words, when the sequence execution unit 24 specifies a required work resource 130, issues a use request REQnm to the work resource 130, and receives permission notifications ACKnm from all of the work resources 130, the sequence execution unit 24 issues a command CMDnm to the related work resource 130. Contents of processing for robot (S206*) in the present specific example are slightly different from those of the processing for robot (S206) in FIG. 7, but will be described below.

When issuing the command CMDnm, the sequence execution unit 24 waits up to the defined pre-issue timing (S246). At the time of the pre-issue timing, the sequence execution unit 24 specifies a work resource 130 newly required in the next process (S226). Then, the sequence execution unit 24 issues a use request REQnm to the specified work resource 130 (S232*). The use request REQnm includes also the content of a preparatory operation of the work resource 130 required for starting the next process in addition to the identification information of the item and the value of the current process count CNT. When there is no work resource 130 newly required in the next process, the sequence execution unit 24 skips steps S230, S206*, and S232*.

When it is not necessary to issue the use request REQnm, or when the use request REQnm can be issued, the sequence execution unit 24 waits until the current process is completed; that is, the completion notification DONEnm is received (S216). Upon receiving the completion notification DONEnm, the sequence execution unit 24 compares the process count CNT with the maximum number of processes CNTmax (S218). When the CNT CNTmax, the sequence execution unit 24 releases all of the work resources 130 (S220), and then notifies the production management unit 22 of the completion of machining (S222).

On the other hand, when CNT<CNTmax, the sequence execution unit 24 releases the work resource 130 that is no longer needed in the next process (S224). Then, since the use request REQnm for the work resource 130 required in the next process has already been issued, the sequence execution unit 24 waits after that time until the permission notification ACKnm is obtained for all of the work resources 130 (S234). When the permission notification ACKnm is obtained for all of the work resources 130, the process returns to step S212, and the same processing is repeated thereafter.

Figure 15:
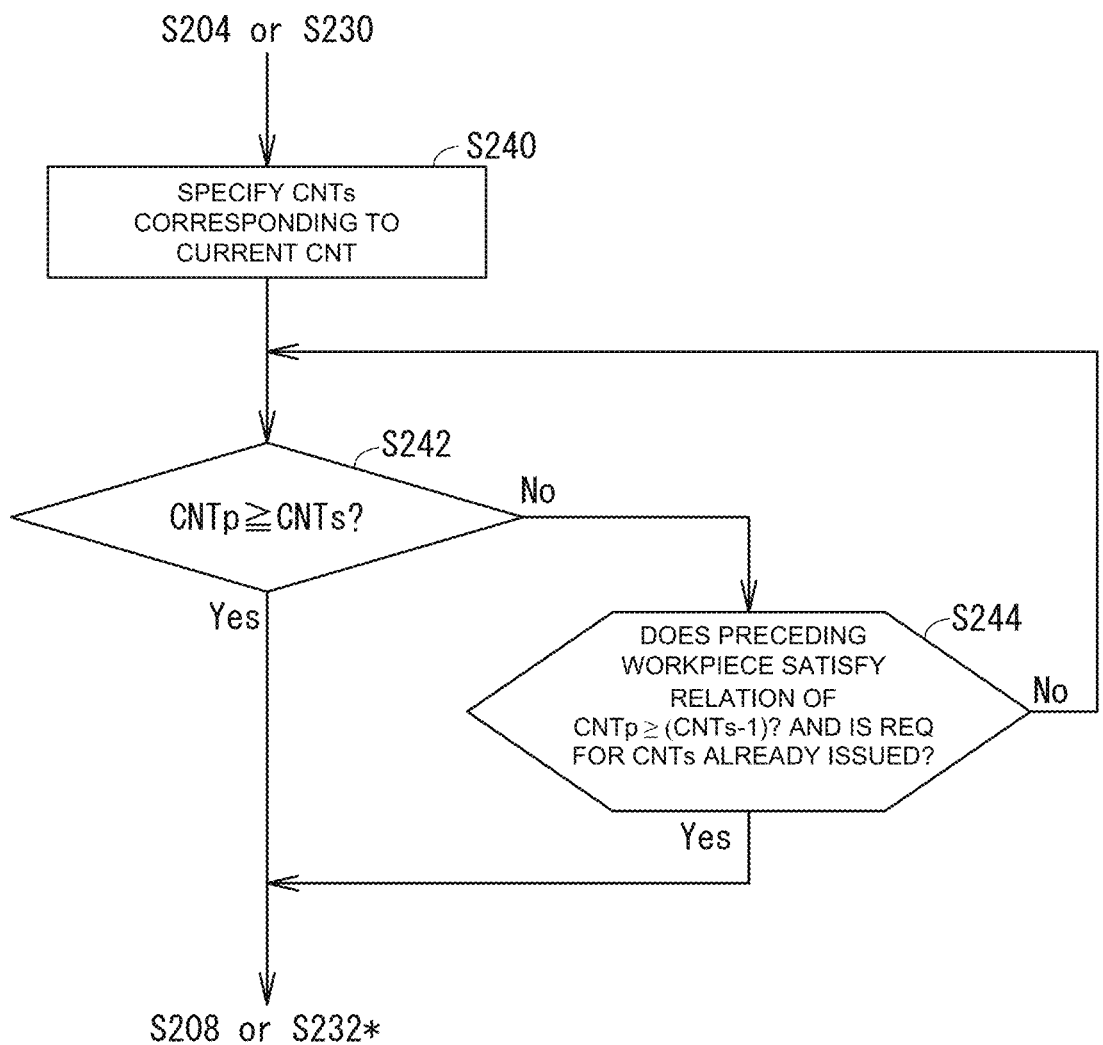
FIG. 15 is a flowchart showing a flow of processing for robot in FIG. 13 and FIG. 14.

The processing for robot (S206*) in the present specific example will be described below with reference to FIG. 15. The processing in FIG. 15 is different from the processing in FIG. 9 in that there is step S244. In other words, in the processing for robot in FIG. 9, the preceding workpiece passing determination process count CNTs corresponding to the current process count CNT of the succeeding workpiece is specified (S240), and when the process count (that is, the preceding process count CNTp) of the preceding workpiece reaches the preceding workpiece passing determination process count CNTs (Yes in S242), the issuance of the use request REQnm of the succeeding workpiece is permitted.

In the present example, as described above, each of the sequence execution units 24 issues the request for the next process before the current process is completed. Therefore, even when the preceding workpiece does not reach the preceding workpiece passing determination process count CNTs, there is a possibility that the use request REQnm for the preceding workpiece passing determination process count CNTs is issued. Therefore, in the present example, when CNTp<CNTs (No in step S242) as shown in FIG. 15, the process count of the preceding workpiece reaches (CNTs−1), and it is confirmed whether the use request for CNTs has already been issued (S244). When the use request for CNTs has been issued, the process proceeds to step S208 or S232*, and the issuance of the use request REQnm is permitted. Thereby, the use request REQnm can be issued earlier, and a wasteful waiting time of the workpiece can be reduced. As a result, production efficiency of the article can be further improved.

Figure 16:
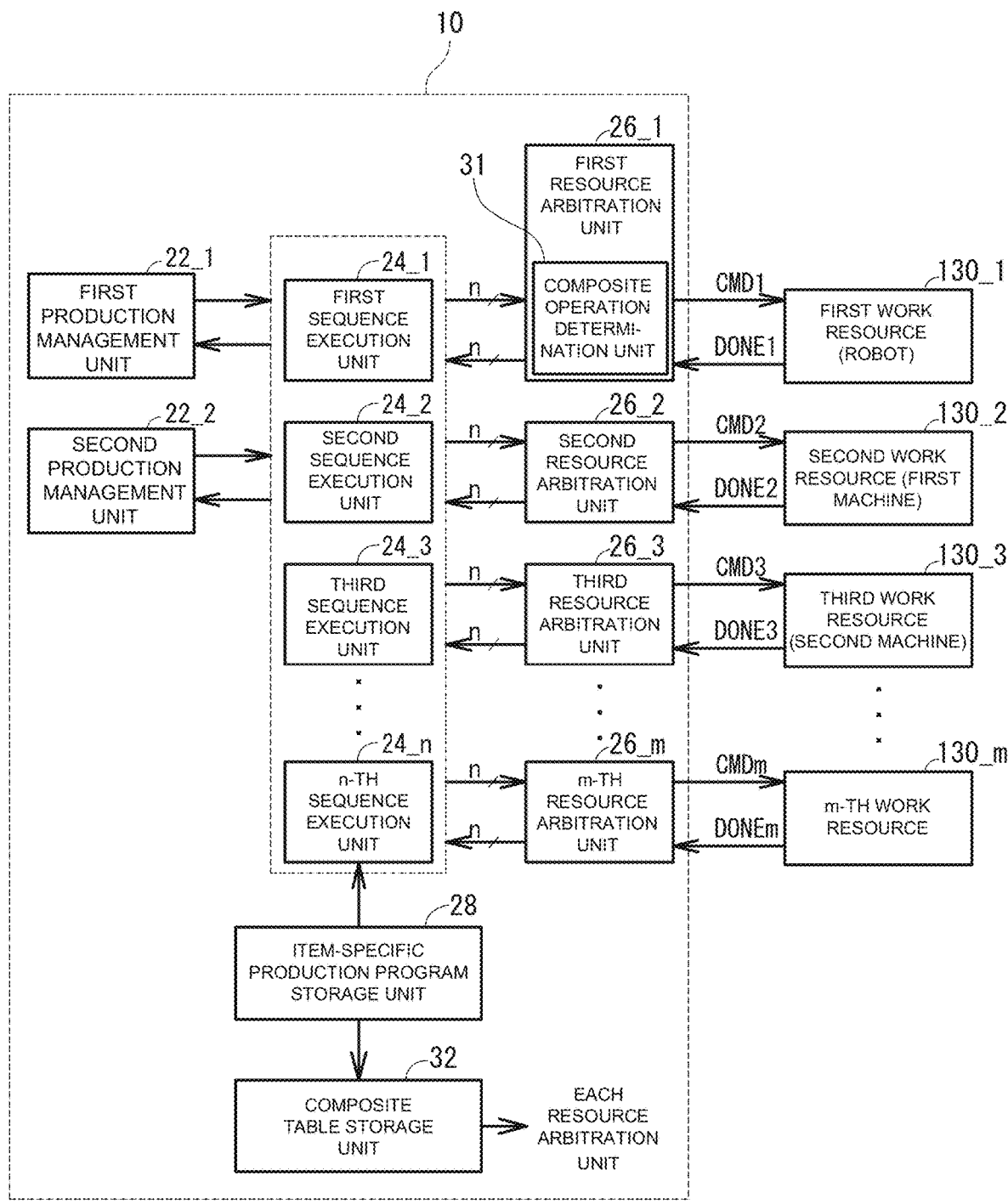
FIG. 16 is a functional block diagram of a cell controller of another specific example.

Another specific example will be described below. FIG. 16 is a functional block diagram of a cell controller 10 of another specific example. The cell controller 10 of the present specific example is different from the cell controller 10 described above in that two processes executable in parallel are specified from a plurality of processes constituting a production program and the two processes are executed in parallel when timings are right.

Specifically, the double-hand type robot 110 can hold two workpieces at the same time. Therefore, one hand can hold a succeeding workpiece before cutting, and the other hand can hold a preceding workpiece after cutting. Then, using such a double-hand type robot 110, a process of detaching the preceding workpiece from the machine and a process of attaching the succeeding workpiece to the machine can be executed in parallel. The machining cell 100 includes an element such as the double-hand type robot 110 capable of simultaneously assigning two or more workpieces, and by using such an element, can execute another process for the succeeding workpiece in parallel with a predetermined process for the preceding workpiece. When there are processes that can be executed in parallel in this way, it is possible to shorten a time by executing these processes in parallel.

In the present example, therefore, two processes executable in parallel are specified, and at timing when the succeeding workpiece or the preceding workpiece requests the execution of one of the two processes, the two processes are executed in parallel when the preceding workpiece or the succeeding workpiece requests the execution of one of the two processes. In order to realize such an operation, as shown in FIG. 16, the cell controller 10 of the present specific example includes a composite table storage unit 32, and each of resource arbitration units 26 includes a composite operation determination unit 31.

The composite table storage unit 32 stores a composite table. The composite table is a table that is recorded with a pair of two different processes executable in parallel and a resource program (hereinafter, referred to as "composite program") when the two processes are executed in parallel. The composite program functions as a composite command that allows the work resource 130 to execute two or more processes. FIG. 17 is a diagram showing an example of the composite table. In the example of FIG. 17, identification information of a process of a succeeding workpiece, identification information of a process of a preceding workpiece executable in parallel with the process of the succeeding workpiece, and identification information of a composite program corresponding to the two processes are stored in association with each other. For example, a first row of the composite table is recorded with a process number "3" of the succeeding workpiece and a process number "8" of the preceding workpiece. Further, the first row is also recorded with a name "RPR003C-W01234" of a resource program required to execute the process number "3" and the process number "8" in parallel.

The composite table may be recorded in the cell controller 10 in a state of being created in advance by the operator. Alternatively, the cell controller 10 may automatically generate a composite table. In this case, the operator creates in advance detailed configurations of the machining cell 100 (for example, the number and types of hands attached to the robot 110), identification information on a hand for holding a workpiece in the process using the robot 110, and identification information on a conveyance destination or a conveyance source of the workpiece in the conveying process of the workpiece, and registers them in the machining cell 100 as preliminary information. Such preliminary information may be recorded in a file independent of the production program, or may be incorporated into the production program. The cell controller 10 may automatically generate a composite table based on such preliminary information and the production program. Alternatively, the above-described preliminary information may be collected by a dialogue between the cell controller 10 and the operator, and the cell controller 10 may generate a composite table.

Figure 18:
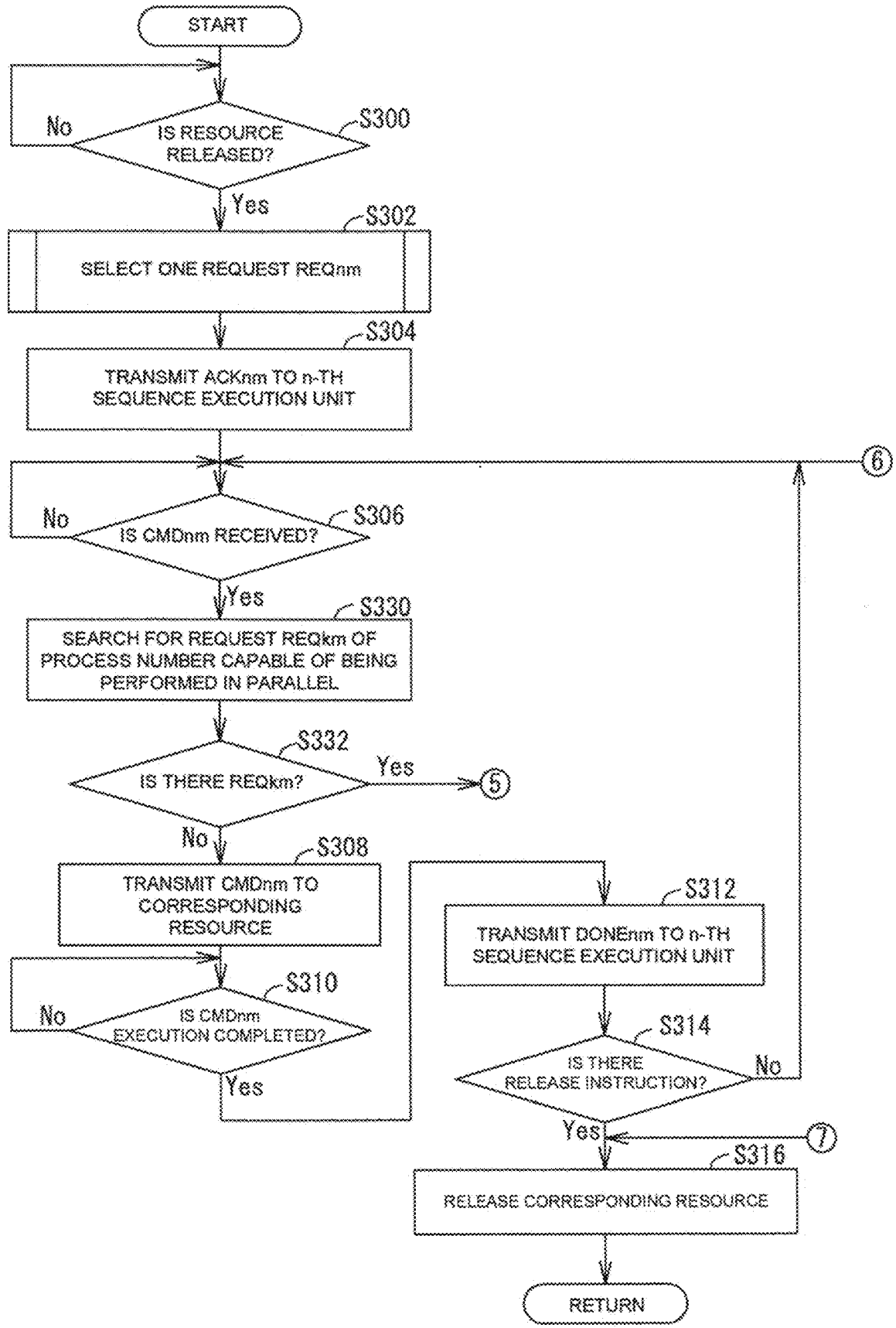
FIG. 18 is a flowchart showing a first half of a processing flow of a resource arbitration unit including a composite operation determination unit.
Figure 19:
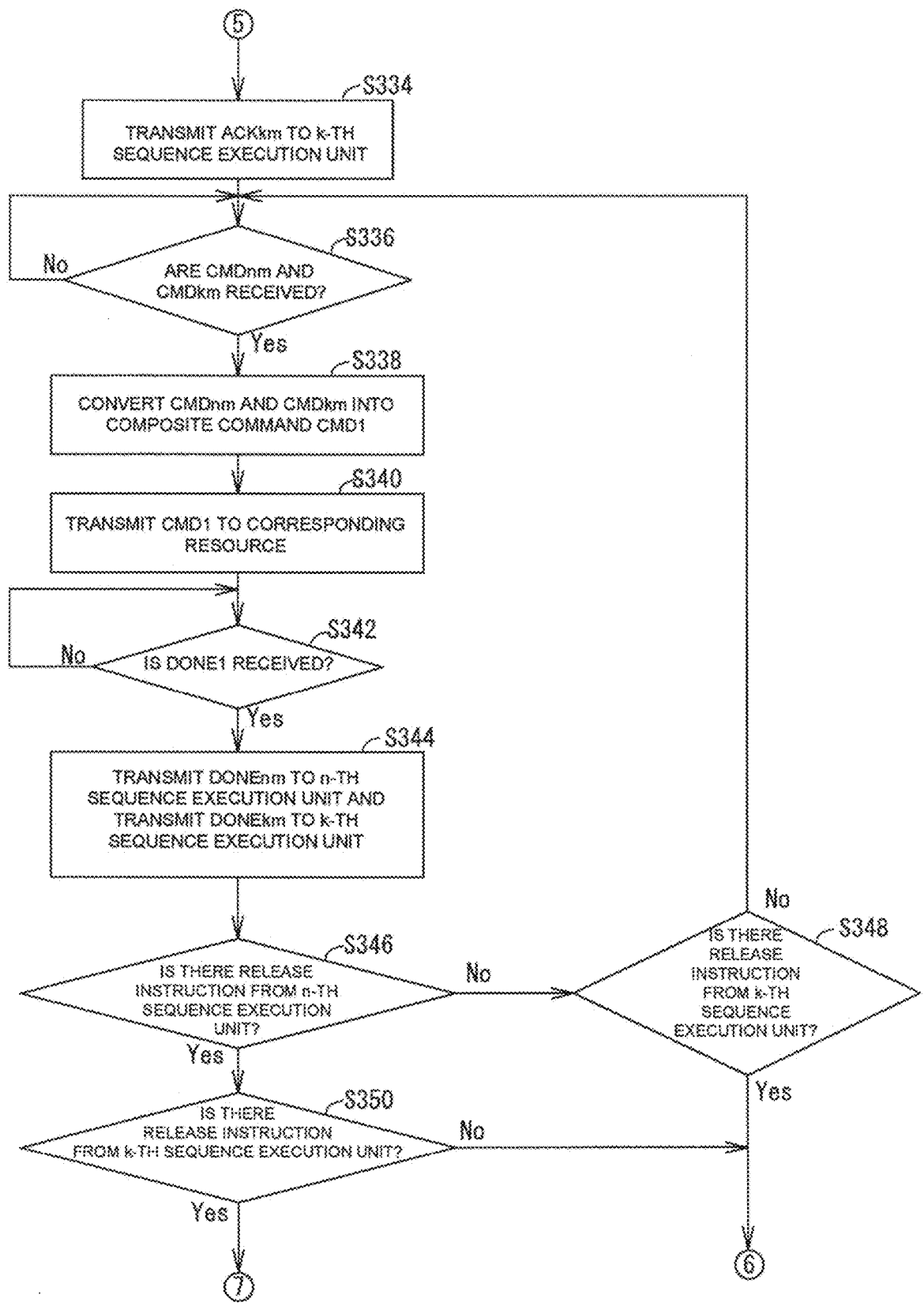
FIG. 19 is a flowchart showing a latter half of the processing flow of the resource arbitration unit including the composite operation determination unit.

As shown in FIG. 16, each of the resource arbitration units 26 includes the composite operation determination unit 31. The composite operation determination unit 31 refers to the composite table, determines whether the processes are integrated, and, when the processes are integrated, instructs the corresponding work resource 130 to execute a composite program in which two processes are integrated. FIG. 18 and FIG. 19 are flowcharts showing a processing flow of the resource arbitration unit 26 including the composite operation determination unit 31.

Similarly to the processing flows of FIG. 11 and FIG. 12, the resource arbitration unit 26 first waits until the corresponding work resource 130 becomes free (S300), and selects one use request REQnm from a plurality of received use requests in a case of a free state (S302). Then, the resource arbitration unit 26 transmits the permission notification ACKnm to the n-th sequence execution unit 24_$n$ that issues the use request REQnm (S304). When the command CMDnm is transmitted from the sequence execution unit 24 that has received the permission notification ACKnm (Yes in S306), the resource arbitration unit 26 specifies a process number in parallel with the process indicated by the command CMDnm, and searches for a use request REQkm corresponding to the process number from the plurality of received use requests (S330). As a result of the search, upon receiving the use request REQkm regarding the process that can be performed in parallel (Yes in S332), the resource arbitration unit 26 proceeds to step S334. On the other hand, upon not receiving the use request REQkm, the resource arbitration unit 26 executes steps S308 to S314. The contents of steps S308 to S316 are identical to those of steps S308 to S316 in FIG. 11 and FIG. 12, and thus will not be described herein.

In step S334, the resource arbitration unit 26 transmits a permission notification ACKkm to a k-th sequence execution unit 24_k. Therefore, at this point, both the n-th sequence execution unit 24_n and the k-th sequence execution unit 24_k are permitted to use the corresponding work resource 130. Meanwhile, at this point, the command CMDnm of the n-th sequence execution unit 24_n is received, but the command CMDkm of the k-th sequence execution unit 24_k is not received, so that the resource arbitration unit 26 waits until the command CMDkm comes from the k-th sequence execution unit 24_k (S336).

When both the command CMDnm and the command CMDkm are obtained (Yes in S336), the resource arbitration unit 26 refers to the composite table, and converts the two commands CMDnm and CMDkm into a composite command CMD1 (S338). The composite command CMD1 includes identification information of the composite program. The resource arbitration unit 26 transmits the composite command CMD1 to the corresponding work resource 130 (S340). Thereafter, the work resource 130 executes both the process requested by the n-th sequence execution unit 24_n and the process requested by the k-th sequence execution unit 24_k in parallel.

The resource arbitration unit 26 waits until a completion notification DONE1 is sent from the work resource 130 (S342). Upon receiving the completion notification DONE1, the resource arbitration unit 26 transmits a completion notification DONEnm to the n-th sequence execution unit 24_n, and transmits a completion notification DONEkm to the k-th sequence execution unit 24_k.

When the execution of one process is completed, the resource arbitration unit 26 then confirms whether there is an instruction to release the work resource 130 (S346 to S350). Then, when neither the n-th sequence execution unit 24_n nor the k-th sequence execution unit 24_k gives an instruction to release the work resource 130 (No in S346 and No in S348), the resource arbitration unit 26 returns to step S336 and repeats subsequent processing. On the other hand, when there is no release instruction from the n-th sequence execution unit 24_n, but there is a release instruction from the k-th sequence execution unit 24_k (No in S346 and Yes in S348), the resource arbitration unit 26 returns to step S306, and repeats subsequent processing. Further, when both the n-th sequence execution unit 24_n and the k-th sequence execution unit 24_k give a release instruction (Yes in S346 and Yes in S350), the resource arbitration unit 26 proceeds to step S316, and releases the work resource 130. Further, when there is a release instruction from the n-th sequence execution unit 24_n, but there is no release instruction from the k-th sequence execution unit 24_k (Yes in S346 and No in S350), the resource arbitration unit 26 proceeds to step S306. In step S306, "command CMDnm" is described, but in this case, "m" is replaced with "n" and the processing proceeds.

As is clear from the above description, according to the present example, two processes are executed in parallel as long as the timings are right. As a result, the time required for the production of the article can be further shortened, and production efficiency can be further improved. In this case, the sequence execution unit 24 may perform the processing shown in FIG. 7 to FIG. 9, or may perform the processing shown in FIG. 13 to FIG. 15. When the sequence execution unit 24 performs the processing shown in FIG. 13 to FIG. 15, a time becomes longer until the command CMDnm is received (S306) after the resource arbitration unit 26 issues the permission notification ACKnm to the preceding workpiece (S304). Therefore, the possibility of receiving the use request REQkm of the succeeding workpiece increases in the meantime. As a result, when the sequence execution unit 24 performs the processing shown in FIG. 13 to FIG. 15, the possibility increases that two processes can be executed in parallel, so that production efficiency can be improved more reliably.

Figure 22:
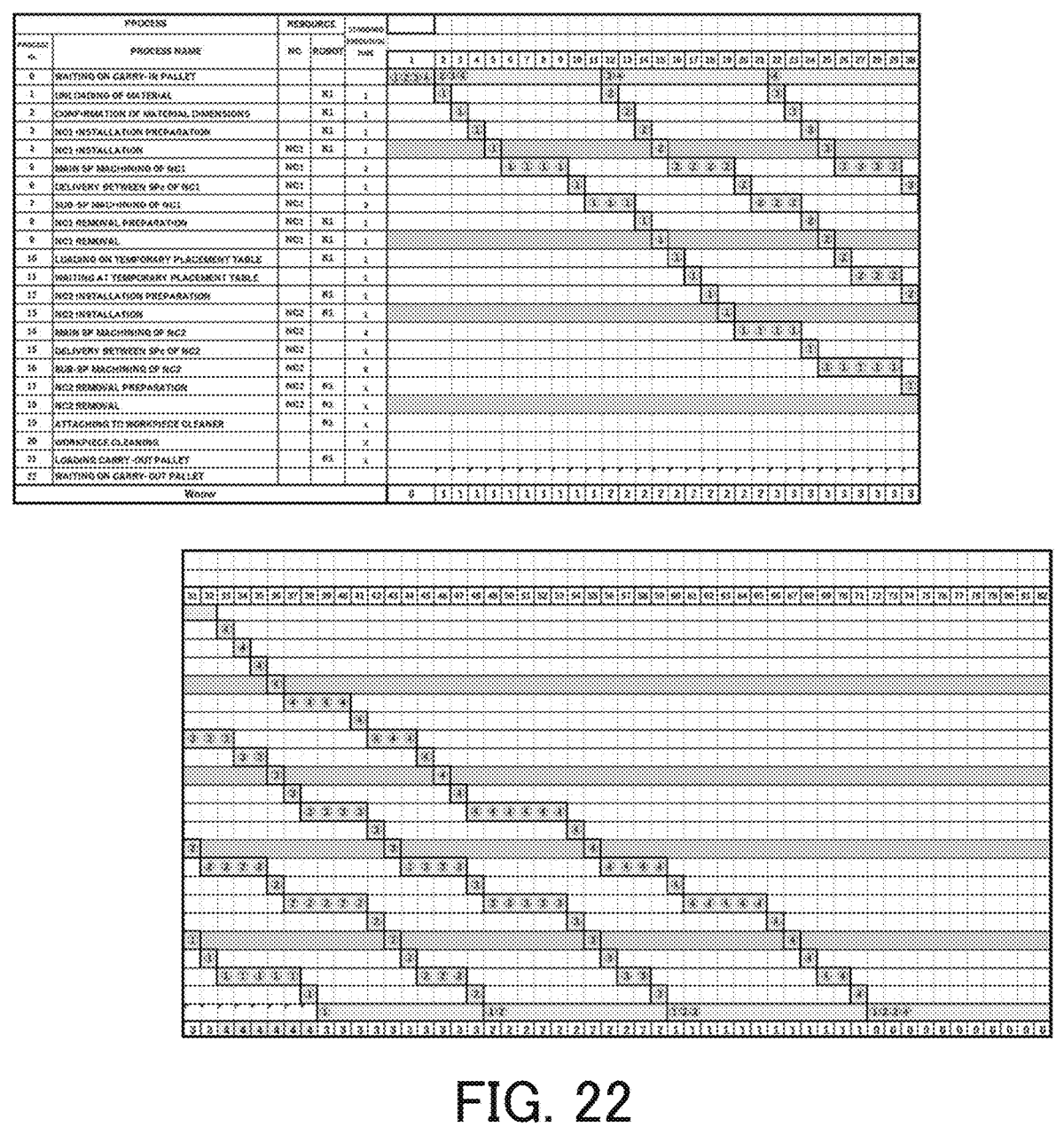

FIG. 20 to FIG. 22 are diagrams showing results obtained by simulating algorithms of the cell controller 10 disclosed in the present disclosure. In the simulation, the algorithms of FIG. 13 to FIG. 15 are adopted as the sequence execution unit 24, and the algorithms of FIG. 18 and FIG. 19 are adopted as the resource arbitration unit 26. FIG. 20 to FIG. 22 show a transition of the process with a lapse of time of each workpiece, assuming that the process advances downward and the time advances to the right. A "standard execution time" indicates a standard execution time of each process when one row of a spreadsheet is regarded as one unit time. Therefore, when the time (number of cells) in which the workpiece is located in the row of one process exceeds the standard execution time, it can be said that the workpiece is waiting for the work resource to be used in the next process to become available. In the following description, a j-th workpiece of an i-th item is referred to as "workpiece Wij". Therefore, a second workpiece of a first item is referred to as "workpiece W12", and a third workpiece of a second item is referred to as "workpiece W23".

FIG. 20 shows a state in which four first items are machined by the first machine 102 and four second items are machined by the second machine 104. In the example, the use request is issued to the robot 110 in the order of workpiece W11, workpiece W21, workpiece W12, and workpiece W22. As a result, as shown in FIG. 20, the workpiece Wi 1 is first produced and is attached to the first machine 102 by the robot 110. Then, at timing 7 when the robot 110 becomes free, the robot 110 is assigned to the workpiece W21, and production of the workpiece W21 is started. Similarly, the robot 110 is assigned to the workpiece W12 at timing 12, and is assigned to the workpiece W22 at timing 27, thereby production of each of the workpieces is started. Then, the execution sequence of the respective workpieces is arbitrated by the resource arbitration unit 26 such that the respective workpieces do not contend with each other.

For example, the workpiece W12 continuously waits until timing 23 because a process "3" is completed at timing 14, but the first machine 102 used in a next process "4" is occupied by the preceding workpiece W11. In addition, at timing 24, a process "4" of the workpiece W12 and a process "9" of the workpiece W11 are integrated according to the composite table and executed in parallel.

FIG. 21 shows a simulation result when a standard execution time of a process "13: workpiece cleaning" is longer than that in FIG. 20. In this case, congestion of workpieces is likely to occur in front of the workpiece cleaner 116. As a result, a maximum loaded number Wnow to be simultaneously loaded into the machining cell 100 is "4" in the example of FIG. 20, but increases to "5" in the example of FIG. 21.

FIG. 22 shows a simulation result when the process using the first machine 102 and the process using the second machine 104 are connected in series. In other words, FIG. 22 shows a simulation result when one workpiece is subjected to both cutting with the first machine 102 and cutting with the second machine 104. Even in this case, it can be seen that the contention between the workpieces is arbitrated by the resource arbitration unit 26 to efficiently produce a plurality of workpieces.

Figure 23:
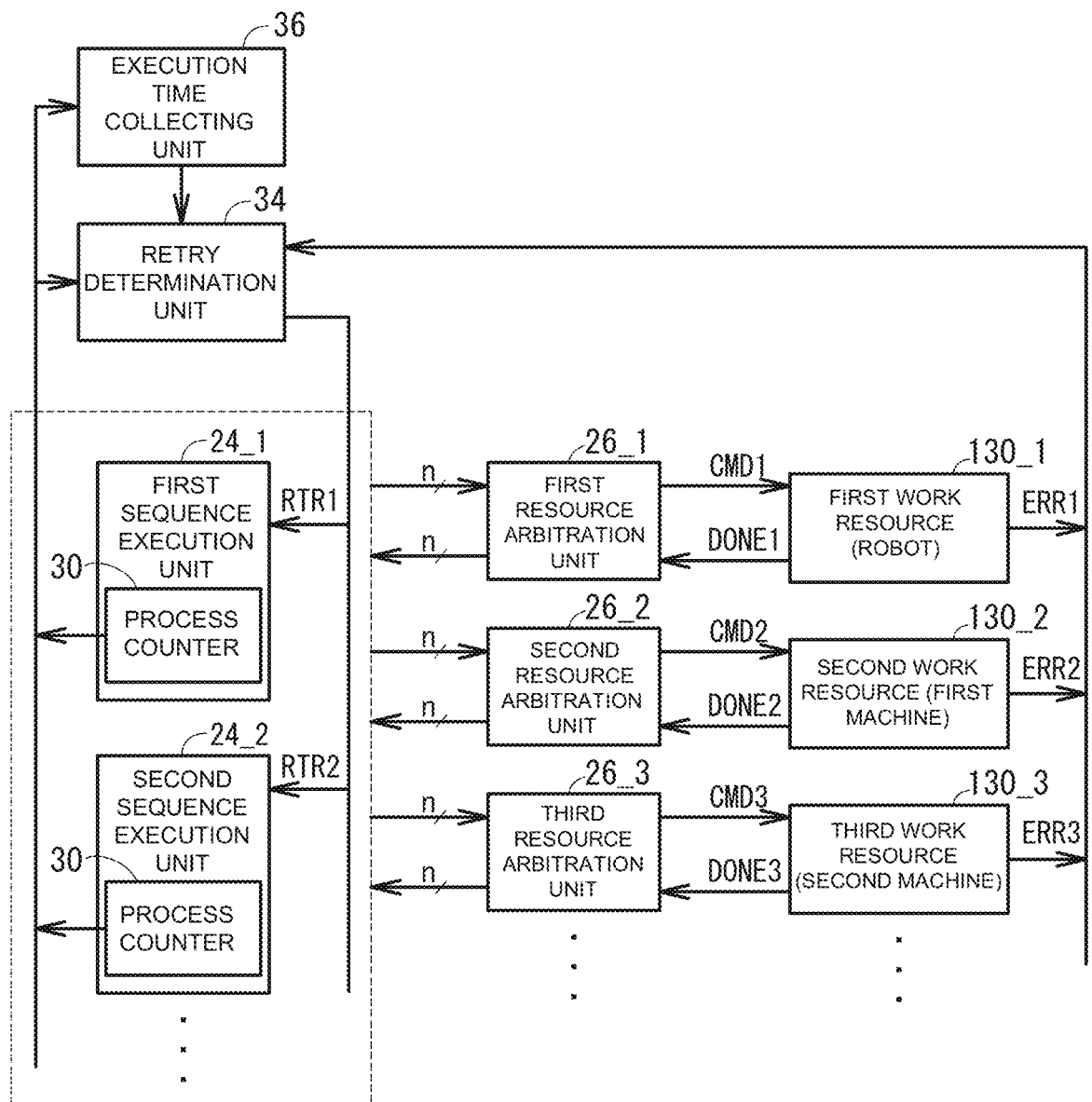
FIG. 23 is a diagram showing a partial configuration of a cell controller another specific example.

Next, further another specific example will be described. FIG. 23 is a diagram showing a partial configuration of a cell controller 10 of another specific example. The cell controller 10 is different from the cell controller 10 in FIG. 2 in terms of including a retry determination unit 34. The retry determination unit 34 monitors a status of the process executed by each of the sequence execution units 24, and outputs a retry command RTRn that instructs the sequence execution unit 24 to re-execute the process when it is determined that an abnormality occurs in the process. The presence or absence of the abnormality may be determined based on the elapsed time from the start of each process, or may be determined based on an error signal ERRm from the work resource 130.

When the presence or absence of the abnormality is determined based on the elapsed time, the cell controller 10 further includes an execution time collecting unit 36. The execution time collecting unit 36 collects an execution status of the process from the plurality of sequence execution units 24, and generates a standard execution time table recorded with a standard execution time of each process based on the collected data. Specifically, each of the plurality of sequence execution units 24 is provided with a process counter 30 that counts the current process number. The process counter 30 outputs count data COUNTn to the execution time collecting unit 36 when counting up. The count data COUNTn include identification information of the sequence execution unit 24 that outputs the count data COUNTn and the current process count CNT. The execution time collecting unit 36 measures a count-up interval time for each process, and stores it as an execution time of the process. In the present example, the plurality of sequence execution units 24 execute the same production program while shifting time. Therefore, a plurality of execution times can be obtained for one process. The execution time collecting unit 36 calculates a representative value obtained by performing statistical processing on the plurality of execution times obtained for one process, such as an average value or an intermediate value, as a standard execution time of the process. Then, the execution time collecting unit 36 generates a standard execution time table recorded with the process and the standard execution time corresponding to the process in association with each other, and outputs the standard execution time table to the retry determination unit 34.

The retry determination unit 34 monitors the elapsed time from the start of each of the plurality of processes, and determines that an abnormality occurs when the elapsed time exceeds an allowable execution time determined based on the standard execution time. The count data COUNTn is also input to the retry determination unit 34 to measure the elapsed time from the start of the process. The retry determination unit 34 measures an elapsed time after counting up with an internal timer. Further, the allowable execution time is not particularly limited as long as it is longer than the standard execution time. For example, the allowable execution time is twice or more the standard execution time. When the elapsed time of one process exceeds the allowable execution time of such a process, the retry determination unit 34 determines that some abnormality has occurred in the execution of such a process.

In the above example, the count-up interval time of the process counter 30 is acquired as a process execution time. However, the count-up interval time includes not only a work time (that is, a time until the DONEnm is received from the issuance of the CMDnm) when the work resource 130 actually executes the process, but also a request waiting time until the permission notification ACKnm is obtained after the use request REQnm is issued to execute the next process. When such a request waiting time is included in the itinerary execution time, the presence or absence of an abnormality of the process may be accurately determined in some cases. Therefore, instead of the count-up interval time, the work time until the DONEnm is received from the issuance of the CMDnm may be treated as the process execution time. In this case, the sequence execution unit 24 transmits to the execution time collecting unit 36 and the retry determination unit 34 the count data COUNTn at the timing of the count-up of the process counter 30 and the completion notification DONEnm at the timing of receiving the completion notification DONEnm. The execution time collecting unit 36 and the retry determination unit 34 treat the time from the reception of the count data COUNTn to the reception of the completion notification DONEnm as the itinerary execution time.

In addition, the retry determination unit 34 may determine that an abnormality has occurred in the execution of the process even when the error signal ERRm is output from the work resource 130 in addition to or in place of the case where the elapsed time from the start of the process exceeds the allowable execution time. Then, when determining that the abnormality has occurred in the execution of the process, the retry determination unit 34 outputs a retry command RTRn to the sequence execution unit 24 that executes the process.

The sequence execution unit 24, which has received the retry command RTRn, cancels the command CMDnm for the work resource 130 that is currently being output, and then re-executes some of the processes. Here, the process to be re-executed may be only the process in which the abnormality has occurred, or may be re-executed from the process before the process in which the abnormality has occurred. For example, when an abnormality occurs during the execution of the process "2" and the retry command RTRn is received, the sequence execution unit 24 cancels the command CMDnm related to the process "2", and then may output the command CMDnm for executing the process "2" from the beginning to the resource arbitration unit 26 again.

Alternatively, a retry point may be set for each process to return when the abnormality occurs, and when the abnormality occurs, a process indicated by the retry point may be re-executed. FIG. 24 is a diagram showing an example of a production program added with a retry point. In FIG. 24, "1" in a "retry point" column indicates a process that functions as a retry point. When receiving the retry command RTRn, the sequence execution unit 24 traces to an immediately preceding retry point and re-executes the process.

For example, when receiving the retry command RTRn during execution of a process "5", the sequence execution unit 24 first cancels a command CMDnm for the process "5". Subsequently, the sequence execution unit 24 refers to the production program, and confirms the "retry point" column of the process "5". In the example of FIG. 24, the "retry point" column of the process "5" is not recorded with "1". Therefore, in this case, the sequence execution unit 24 traces to a previous process "4", and confirms a "retry point" thereof. Since the "retry point" of the process "4" is recorded with "1", the sequence execution unit 24 determines that the process "4" is a retry point, and re-executes the process from the process "4". In other words, the sequence execution unit 24 issues a command CMDnm and a use request REQnm necessary for the re-execution of the process "4". Further, when tracing to the process in this way, the sequence execution unit 24 decrements the value of the process count CNT by the number of processes traced back.

As described above, the present example has a configuration in which the presence or absence of the abnormality is monitored in the execution of the process, and when the abnormality occurs, one or more processes including the process in which the abnormality occurs are re-executed. With such a configuration, it is possible to easily deal with the abnormality without changing the control program of the cell controller 10.

However, depending on the content of the process, the process may not be re-executed unless the work resource 130 performs a special return operation. Therefore, instead of a normal process of executing when no abnormality occurs, an alternative process to be executed when the process is re-executed is prepared in advance, and the alternative process may be executed when the retry command RTRn is received. FIG. 25 is a diagram showing an example of a production program in which an alternative process is added. In the example of FIG. 25, a column of "alternative process" is added to the production program. The number of the alternative process to be performed at the time of re-execution is described in the column of the "alternative process". Further, a row of the alternative process is added to the production program. The row of the alternative process is recorded with an alternative resource program to be executed in the alternative process.

Upon receiving the retry command RTRn, the sequence execution unit 24 confirms an "alternative process number" corresponding to the process currently being executed, and when there is no "alternative process number", re-executes the currently executing process as it is. On the other hand, when the "alternative process number" is defined, the sequence execution unit 24 executes the alternative resource program described in the row of the alternative process number.

In the example of FIG. 25, the alternative process number is not defined in a process "7". Therefore, upon receiving the retry command RTRn at the time of execution of the process "7", the sequence execution unit 24 re-executes the process "7" as it is. On the other hand, in the example of FIG. 25, "100800" is defined as an alternative process number in a process "8". Therefore, upon receiving the retry command RTRn at the time of execution of the process "8", the sequence execution unit 24 does not re-execute the process "8" but executes an alternative process "100800". In other words, the sequence execution unit 24 outputs an alternative resource program defined in a row of the alternative process "100800" to the resource arbitration unit 26, as a command CMDnm. In this way, it is possible to deal with the abnormality more reliably by setting the alternative process in advance.

Figure 26:
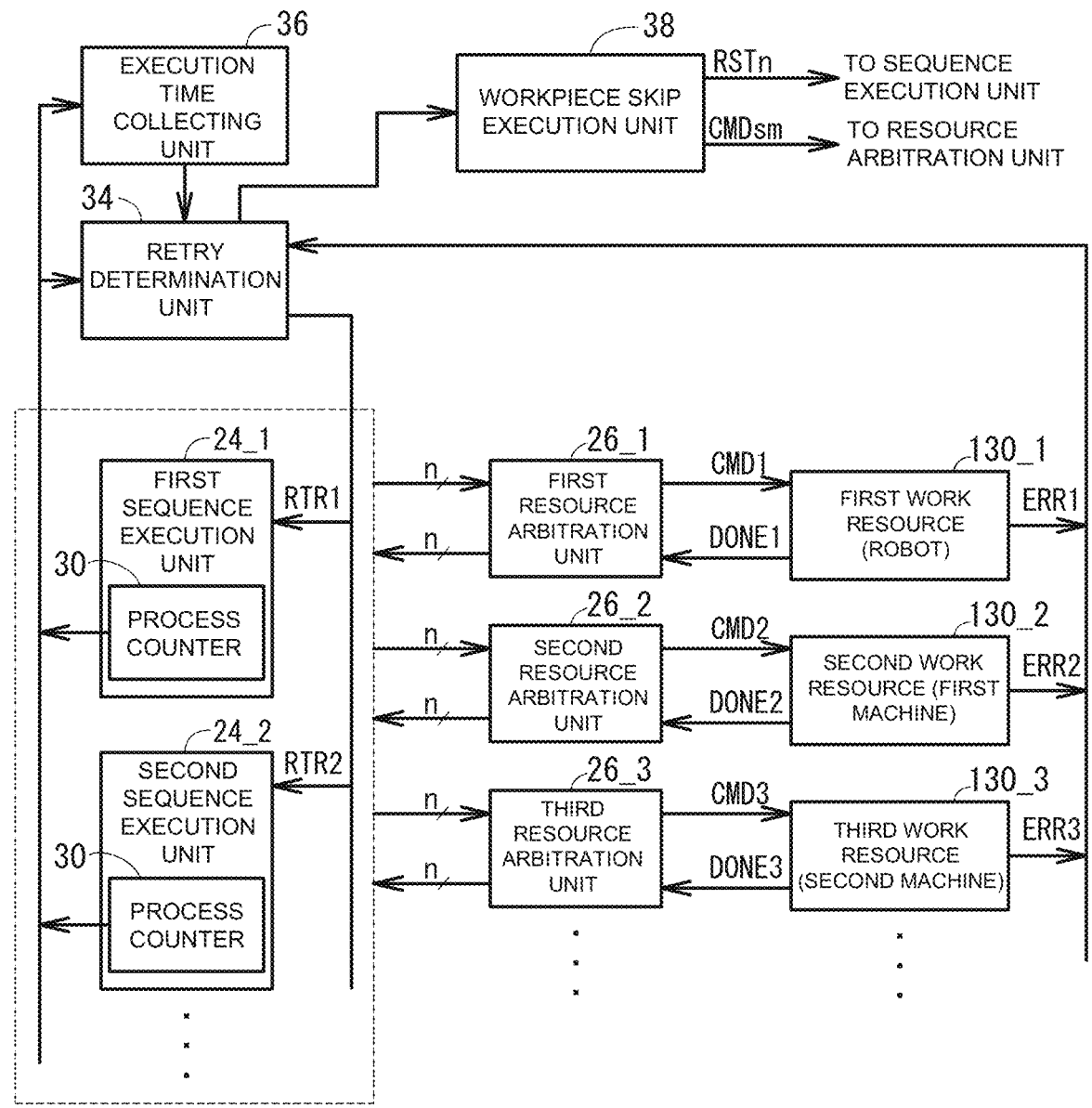
FIG. 26 is a diagram showing a partial configuration of a cell controller of another specific example.

Another specific example will be described below with reference to FIG. 26. A cell controller 10 in FIG. 26 is different from the cell controller 10 in FIG. 23 in terms of further including a workpiece skip execution unit 38. The workpiece skip execution unit 38 executes a defined workpiece skip process and disposes of the workpiece when determining that it is difficult to eliminate an abnormality.

In other words, when detecting the occurrence of the abnormality, the retry determination unit 34 instructs the sequence execution unit 24 to execute the retry for executing the normal process or the alternative process. However, when there is any problem with the workpiece, the abnormality may not be eliminated even when such a retry is repeated. When such a situation is left as it is, the succeeding workpiece cannot proceed with the process, resulting in congestion.

Therefore, the workpiece skip execution unit 38 counts the number of times that the retry command RTRn for the same process is continuously output to the same sequence execution unit 24, as the number of continuous retries. Then, when the number of continuous retries reaches a predefined allowable number of times, the defined workpiece skip process is executed.

In the workpiece skip process, the workpiece skip execution unit 38 issues a compulsory command CMDsm to the resource arbitration unit 26 corresponding to the work resource 130 required to convey to a disposal site the workpiece, in which the abnormality occurs, as an NG product. Here, when the plurality of work resources 130 are required for conveyance to the disposal site, the workpiece skip execution unit 38 issues the command CMDsm to the plurality of resource arbitration units 26. Upon receiving the command CMDsm, the resource arbitration unit 26 transmits the command to the corresponding work resource 130. Then, when the work resource 130 operates according to the command CMDsm, the workpiece in which the abnormality occurs is conveyed to the disposal site. When the disposal operation is completed; that is, when the completion notification DONEsm is returned from the resource arbitration unit 26 to the workpiece skip execution unit 38, the workpiece skip execution unit 38 issues a reset command RSTn to the sequence execution unit 24 that manages the production of the disposed workpiece. Upon receiving the reset command RSTn, the sequence execution unit 24 resets the value of the process counter 30, and notifies the production management unit 22 that the disposed workpiece has occurred. Thereafter, the sequence execution unit 24 waits until anew workpiece loading command is received. On the other hand, upon receiving the disposal notification of the workpiece, the production management unit 22 decrements the value of the loaded number Wnow of the workpieces managed by itself.

As described above, in the present specific example, when the number of continuous retries reaches the allowable number of times, the workpieces in which the abnormality occurs is forcibly disposed of, while other workpieces in which no abnormality occurs are continuously executed with the production program as usual. In other words, according to the present specific example, it is not necessary to design a recovery process for other workpieces in which no abnormality occurs, design man-hours for workpiece skipping can be significantly reduced, and design mistakes of the process can be prevented.

The configurations described above are examples, and other configurations may be changed as appropriate as long as the cell controller 10 controls the operation of the machining cell 100 based on the production program recorded with one or more processes required to produce only one target item in the machining cell 100.

REFERENCE SIGNS LIST 10 cell controller
12 processor
14 memory
16 communication I/F
18 input device
20 output device
22 production management unit
24 sequence execution unit 26 resource arbitration unit
28 item-specific production program storage unit
30 process counter
31 composite operation determination unit
32 composite table storage unit
34 retry determination unit
36 execution time collecting unit
38 workpiece skip execution unit
100 machining cell
102 first machine
104 second machine
106 main spindle
108 sub-spindle
110 robot
111 hand
112 hand stocker
114 jaw stocker
116 workpiece cleaner
118 workpiece measuring device
120 temporary placement table
122 carry-in pallet
124 carry-out pallet
130 work resource.

The invention claimed is:

1. A cell controller for controlling an operation of a machining cell including two or more machines and one or more robots, each of the two or more machines and the one or more robots being regarded as a plurality of work resources,
the cell controller being configured to:
receive a production program recorded with one or more processes to be executed at the time of producing only one article of a corresponding item in the machining cell among items produced in the machining cell; and
control the operation of the machining cell based on the production program,
wherein the production program includes at least one of a process number, a process name, a type of the plurality of work resources to be used, and identification information on a resource program for operating the work resource for each of the one or more processes,
wherein the cell controller comprising:
production management units provided corresponding to the items produced in the machining cell and configured to command loading of a new workpiece into the machining cell to produce an article of the corresponding item;
a plurality of sequence execution units configured to sequentially execute the one or more process recorded in the production program when receiving the command of the loading; and
a plurality of resource arbitration units provided corresponding to the plurality of work resources,
wherein a sequence execution unit, among the plurality of sequence execution units, transmits a command for a work resource, among the plurality of work resources, to a resource arbitration unit corresponding to the work resource, among the plurality of resource arbitration, and
wherein the resource arbitration unit arbitrates timing at which each of the plurality of sequence execution units uses the work resource associated with the resource arbitration unit.

2. The cell controller according to claim 1, wherein before execution of a current process is completed, the sequence execution unit outputs a use request for a work resource newly required in a next process to the resource arbitration unit associated with the work resource.

3. The cell controller according to claim 1, wherein a robot, among the one or more robots, includes one or more mounting portions on which hands are mounted,
the sequence execution unit specifies a preceding workpiece passing determination process count, in which the preceding workpiece is required to be completed when a succeeding workpiece issues a use request of the robot, corresponding to a current process when a new robot is required in a next process, and issues a use request for the robot regarding the next process after another sequence execution unit for executing a production process of a preceding workpiece starts to execute the preceding workpiece passing determination process count or issues a use request for a robot regarding the preceding workpiece passing determination process count, and
when the mounting portion used in the next process is equal to a mounting portion used in a next resource calling process of using the robot again, the preceding workpiece passing determination process count is the next resource calling process, and when the mounting portion used in the next process is different from the mounting portion used in the next resource calling process or when the next resource calling process does not exist, the preceding workpiece passing determination process count is the next process.

4. The cell controller according to claim 1, further comprising:
a composite table storage unit configured to store a composite table recorded with two or more processes executable in parallel out of a plurality of processes that make up the production program and a composite command that allows the work resource to execute the two or more processes in parallel, wherein
when receiving execution commands for the two or more processes executable in parallel from each of two or more sequence execution units among the plurality of sequence execution units different from each other, the resource arbitration unit converts the execution commands for the two or more processes into the composite command based on the composite table and outputs the composite command to the work resource.

5. The cell controller according to claim 1, comprising the two or more production management units operating independently of each other, wherein
the cell controller allows the machining cell to produce articles of the items, respectively, in parallel.

6. The cell controller according to claim 1, further comprising:
a retry determination unit configured to monitor a presence or absence of an abnormality regarding the execution of a process of the one or more processes, and, when the abnormality is detected, return to a beginning of the process in which the abnormality is detected or to a retry point set before the beginning of the process to issue a retry command for re-executing one or more processes including the process and to output the retry command to the sequence execution unit.

7. The cell controller according to claim 6, wherein when an alternative process is defined, by an operator, for the process designated to be re-executed by the retry command, the sequence execution unit executes the alternative process.

8. The cell controller according to claim 6, wherein
the retry determination unit determines that the abnormality occurs at least either when an elapsed time from a start of execution of the process exceeds a predefined allowable execution time or when an error is output from the work resource during the execution of the process.

9. The cell controller according to claim 6, further comprising:
a workpiece skip execution unit configured to execute a workpiece skip process of disposing of a current workpiece when a number of continuous retries exceeds a predefined allowable number of times.

\* \* \* \* \*